US012438664B2

(12) United States Patent
Fang et al.

(10) Patent No.: US 12,438,664 B2
(45) Date of Patent: Oct. 7, 2025

(54) METHOD FOR PERFORMING MESH CONTROL IN WIRELESS COMMUNICATIONS SYSTEM, AND ASSOCIATED APPARATUS

(71) Applicant: MEDIATEK INC., Hsin-Chu (TW)

(72) Inventors: Po-Chun Fang, Hsinchu (TW); Ray-Kuo Lin, Hsinchu (TW); Tsung-Jung Lee, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 305 days.

(21) Appl. No.: 18/109,273

(22) Filed: Feb. 14, 2023

(65) Prior Publication Data

US 2024/0031094 A1 Jan. 25, 2024

Related U.S. Application Data

(60) Provisional application No. 63/368,378, filed on Jul. 14, 2022.

(51) Int. Cl.
*H04W 84/12* (2009.01)
*H04L 5/00* (2006.01)
*H04W 84/18* (2009.01)

(52) U.S. Cl.
CPC ............ *H04L 5/005* (2013.01); *H04W 84/18* (2013.01)

(58) Field of Classification Search
CPC .......... H04L 5/00; H04L 5/005; H04W 84/18; H04W 84/12
See application file for complete search history.

(56) References Cited

U.S. PATENT DOCUMENTS

| 10,785,798 | B2 | 9/2020 | Seok | |
|---|---|---|---|---|
| 11,357,047 | B2 | 6/2022 | Pandian | |
| 2016/0174079 | A1 | 6/2016 | Wang | |
| 2019/0029038 | A1* | 1/2019 | Kim | H04W 84/12 |
| 2021/0045151 | A1* | 2/2021 | Chen | H04L 5/0091 |
| 2021/0051664 | A1* | 2/2021 | Bhattacharya | H04L 1/203 |
| 2021/0378054 | A1 | 12/2021 | Belur Ramachandra | |
| 2022/0030625 | A1 | 1/2022 | Yang | |
| 2022/0346115 | A1* | 10/2022 | Bhanage | H04W 72/21 |

(Continued)

FOREIGN PATENT DOCUMENTS

| EP | 3 139 690 A1 | 3/2017 |
|---|---|---|
| EP | 3 307 007 A1 | 4/2018 |
| EP | 3 451 782 A1 | 3/2019 |

*Primary Examiner* — Kent Krueger
(74) *Attorney, Agent, or Firm* — Winston Hsu

(57) ABSTRACT

A method for performing mesh control in a wireless communications system and associated apparatus are provided. The method may include: carrying a set of link information in a preamble of a first data transmission frame transmitted from the first mesh device to a second mesh device, wherein the set of link information may include at least one indication among the following indications: a source-destination relationship indication between the first mesh device and the second mesh device and at least one predicted signal strength measured for the first mesh device and the second mesh device; wherein a third mesh device is arranged to monitor wireless transmission in the wireless communications system to obtain the set of link information from the first data transmission frame, and determine spatial reuse (SR) transmission availability of the third mesh device based on the set of link information.

21 Claims, 12 Drawing Sheets

(56) References Cited

U.S. PATENT DOCUMENTS

2023/0239699 A1\* 7/2023 Fang ................... H04W 16/02
  370/254
2024/0080675 A1\* 3/2024 Huang ................ H04W 52/241

\* cited by examiner

METHOD FOR PERFORMING MESH CONTROL IN WIRELESS COMMUNICATIONS SYSTEM, AND ASSOCIATED APPARATUS

CROSS REFERENCE TO RELATED APPLICATIONS

This application claims the benefit of U.S. Provisional Application No. 63/368,378, filed on Jul. 14, 2022. The content of the application is incorporated herein by reference.

BACKGROUND

The present invention is related to communications control, and more particularly, to a method for performing mesh control in a wireless communications system, and associated apparatus such as an access point (AP) device and a station (STA) device.

According to the related art, a wireless communications system comprising a first AP device, a second AP device, etc. may be configured as a mesh network. Based on channel planning, co-channel interference (CCI) may exist when two or more links among various links (e.g., fronthaul and backhaul links) in the mesh network are arranged to use the same channel. For example, in order to prevent any CCI, when one device is transmitting a first packet via a certain channel, another device may need to wait until completion of the transmission of the first packet, and transmit a second packet via this channel afterward, causing overall performance to be degraded. For another example, when one device is transmitting a first packet via a certain channel, another device may make a wrong decision to operate improperly, and the one device may need to re-transmit the first packet via this channel due to the CCI, causing overall performance to be degraded. It seems that no proper suggestion has been proposed in the related art. Thus, a novel method and associated architecture are needed for solving the problem of the related art without introducing any side effect or in a way that is less likely to introduce a side effect.

SUMMARY

It is an objective of the present invention to provide a method for performing mesh control in a wireless communications system, and associated apparatus such as an AP device and a STA device, in order to solve the above-mentioned problem.

It is another objective of the present invention to provide a method for performing mesh control in a wireless communications system, and associated apparatus such as an AP device and a STA device, in order to mitigate the CCI in the mesh network with aid of spatial reuse (SR)-related control.

At least one embodiment of the present invention provides a method for performing mesh control in a wireless communications system, where the wireless communications system comprises a first mesh device, a second mesh device and a third mesh device. For example, the method may comprise: carrying a set of link information in a preamble of a first data transmission frame transmitted from the first mesh device to the second mesh device, wherein the set of link information comprises at least one indication among the following indications: a source-destination relationship indication between the first mesh device and at least one predicted signal strength measured for the first mesh device and the second mesh device; wherein the third mesh device is arranged to monitor wireless transmission in the wireless communications system to obtain the set of link information from the first data transmission frame, and determine SR transmission availability of the third mesh device based on the set of link information.

In addition to the method mentioned above, the present invention further provides the second mesh device that operates according to the method, where the second mesh device may comprise: a processing circuit, arranged to control operations of the second mesh device; and at least one communications control circuit, coupled to the processing circuit, arranged to perform communications control, wherein the at least one communications control circuit is arranged to perform wireless communications operations with the first mesh device for the second mesh device. For example, the second mesh device may be arranged to receive the first data transmission frame carrying the set of link information in the preamble and correctly process the first data transmission frame, without being hindered by any SR transmission performed by the third mesh device to another mesh device with respect to the first data transmission frame.

At least one embodiment of the present invention provides a first mesh device for performing mesh control in a wireless communications system, where the wireless communications system comprises the first mesh device, a second mesh device and a third mesh device, and the first mesh device may comprise: a processing circuit, arranged to control operations of the first mesh device; and at least one communications control circuit, coupled to the processing circuit, arranged to perform communications control, wherein the at least one communications control circuit is arranged to perform wireless communications operations with the second mesh device for the first mesh device. For example, the first mesh device may be arranged to carry a set of link information in a preamble of a first data transmission frame transmitted from the first mesh device to the second mesh device, wherein the set of link information comprises at least one indication among the following indications: a source-destination relationship indication between the first mesh device and the second mesh device and at least one predicted signal strength measured for the first mesh device and the second mesh device; and the third mesh device may be arranged to monitor wireless transmission in the wireless communications system to obtain the set of link information from the first data transmission frame, and determine SR transmission availability of the third mesh device based on the set of link information.

At least one embodiment of the present invention provides a method for performing mesh control in a wireless communications system, where the wireless communications system comprises a first mesh device, a second mesh device and a third mesh device. For example, the method may comprise: monitoring wireless transmission in the wireless communications system to obtain a set of link information from a preamble of a first data transmission frame, wherein the first mesh device is arranged to carry the set of link information in the preamble of the first data transmission frame transmitted from the first mesh device to the second mesh device, wherein the set of link information comprises at least one indication among the following indications: a source-destination relationship indication between the first mesh device and the second mesh device and at least one predicted signal strength measured for the first mesh device and the second mesh device; and determining SR transmission availability of the third mesh device based on the set of link information.

In addition to the method mentioned above, the present invention further provides the third mesh device that operates according to the method, where the third mesh device may comprise: a processing circuit, arranged to control operations of the third mesh device; and at least one communications control circuit, coupled to the processing circuit, arranged to perform communications control, wherein the at least one communications control circuit is arranged to perform wireless communications operations with another mesh device in the wireless communications system for the third mesh device. For example, the second mesh device may be arranged to receive the first data transmission frame carrying the set of link information in the preamble and correctly process the first data transmission frame, without being hindered by any SR transmission performed by the third mesh device to the other mesh device (e.g., the aforementioned another mesh device) with respect to the first data transmission frame.

According to some embodiments, the first data transmission frame may be a physical layer (PHY) protocol data unit (PPDU), and the preamble may be the PHY preamble of the PPDU. For example, the aforementioned at least one indication may be carried in at least one field in the PHY preamble, and the aforementioned at least one field may comprise one or a combination of a basic service set (BSS) color field and an SR field in the PHY preamble.

According to some embodiments, if the set of link information comprises the source-destination relationship indication, the first mesh device may be an AP device or a STA device, the second mesh device may be an AP device or a STA device, and the third mesh device may be an AP device; and if the set of link information comprises the at least one predicted signal strength, the first mesh device may be an AP device or a STA device, the second mesh device may be an AP device or a STA device, and the third mesh device may be an AP device. For example, the set of link information may comprise both of the source-destination relationship indication and the at least one predicted signal strength.

It is an advantage of the present invention that, through proper design, the present invention method, as well as the associated apparatus such as any device among the first mesh device, the second mesh device and the third mesh device, can enhance the overall performance of the wireless communications system. For example, the present invention method and the associated apparatus can mitigate the CCI in the mesh network with aid of SR-related control, and more particularly, maintain coordination of multiple AP devices to prevent the associated performance from degrading. In addition, the present invention method and apparatus can solve the related art problem without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
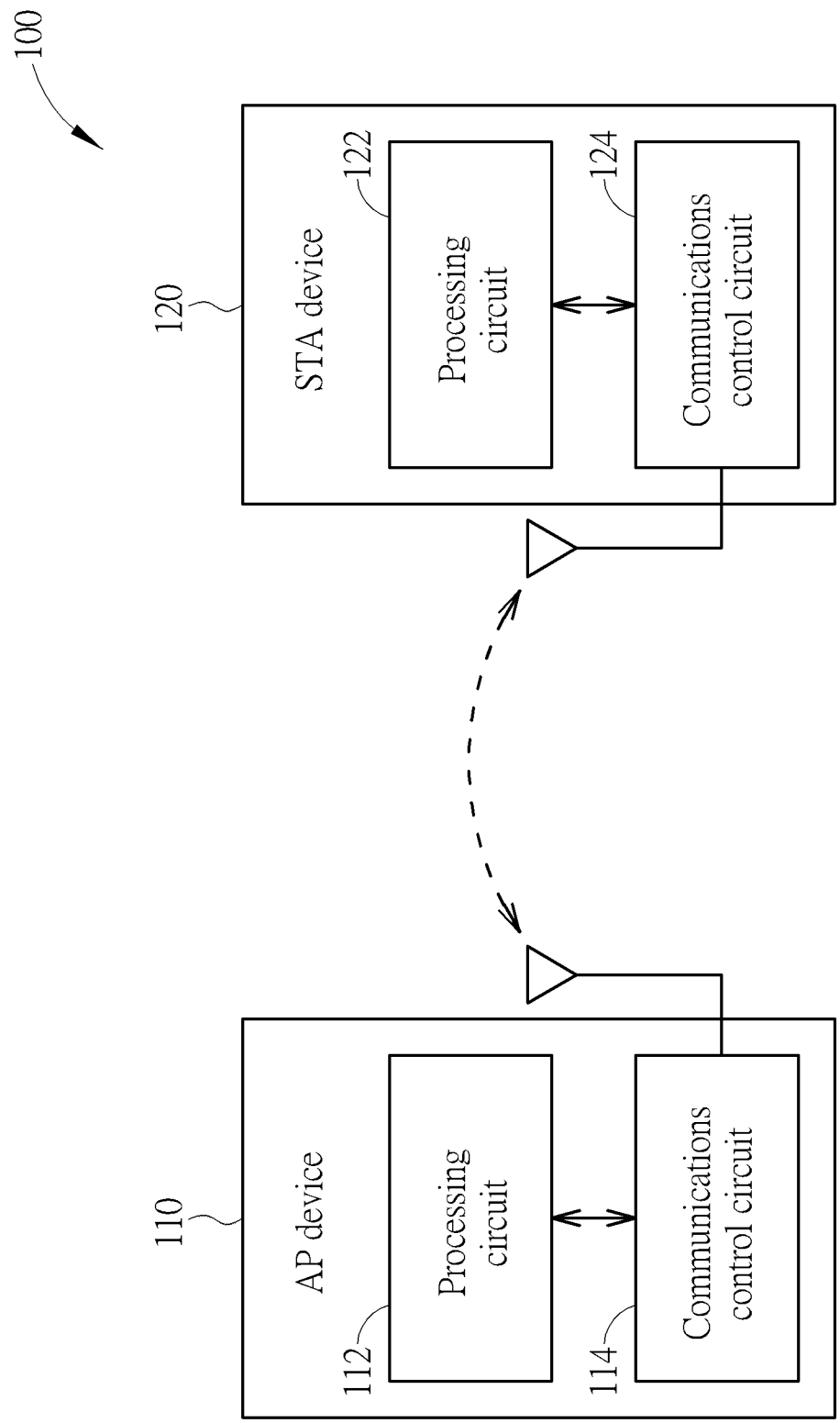
FIG. 1 is a diagram of a wireless communications system according to an embodiment of the present invention.

FIG. 1 is a diagram of a wireless communications system 100 according to an embodiment of the present invention. For better comprehension, the wireless communications system 100 (e.g., any device therein) may be compatible or back-compatible to one or more versions of the Institute of Electrical and Electronics Engineers (IEEE) 802.11 standards, but the present invention is not limited thereto. As shown in FIG. 1, the wireless communications system 100 may comprise multiple devices such as the AP device 110 and the STA device 120, where the AP device 110 may comprise a processing circuit 112, at least one communications control circuit (e.g., one or more communications control circuits), which may be collectively referred to as the communications control circuit 114, and at least one antenna (e.g., one or more antennas) of the communications control circuit 114, and the STA device 120 may comprise a processing circuit 122, at least one communications control circuit (e.g., one or more communications control circuits), which may be collectively referred to as the communications control circuit 124, and at least one antenna (e.g., one or more antennas) of the communications control circuit 124.

In the architecture shown in FIG. 1, the processing circuit 112 can be arranged to control operations of the AP device 110 to make the AP device 110 act as an AP in the wireless communications system 100, and the communications control circuit 114 can be arranged to perform communications control, and more particularly, perform wireless communications operations with the STA device 120 (e.g., the communications control circuit 124 thereof) for the AP device 110. In addition, the processing circuit 122 can be arranged to control operations of the STA device 120 to make the STA device 120 act as an STA in the wireless communications system 100, and the communications control circuit 124 can be arranged to perform communications control, and more particularly, perform wireless communications operations with the AP device 110 (e.g., the communications control circuit 114 thereof) for the STA device 120.

According to some embodiments, the processing circuit 112 can be implemented by way of at least one processor/microprocessor, at least one random access memory (RAM), at least one bus, etc., and the communications control circuit 114 can be implemented by way of at least one wireless network control circuit and at least one wired network control circuit, but the present invention is not limited thereto. In addition, the processing circuit 122 can be implemented by way of at least one processor/microprocessor, at least one RAM, at least one bus, etc., and the communications control circuit 124 can be implemented by way of at least one wireless network control circuit, but the present invention is not limited thereto.

According to some embodiments, the wireless communications system 100 may comprise multiple AP devices and multiple STA devices. For better comprehension, assuming that the AP device count M and the STA device count N may represent positive integers that are greater than one, respectively, the multiple AP devices may comprise MAP devices $\{110\_m|m=0, \ldots, (M-1)\}$ such as the AP devices $\{110\_0, \ldots, 110\_(M-1)\}$, and the multiple STA devices may comprise N STA devices $\{120\_n|n=0, \ldots, (N-1)\}$ such as the STA devices $\{120\_0, \ldots, 120\_(N-1)\}$, where the symbol "m" may represent an integer in the interval [0, M], and the symbol "n" may represent an integer in the interval [0, N], but the present invention is not limited thereto. In addition, the architecture of any AP device 110_$m$ (e.g., each AP device) among the AP devices $\{110\_0, \ldots, 110\_(M-1)\}$ may be the same as or similar to the architecture of the AP device 110, and the architecture of any STA device 120_$n$ (e.g., each STA device) among the STA devices $\{120\_0, \ldots, 120\_(N-1)\}$ may be the same as or similar to the architecture of the STA device 120. For brevity, similar descriptions for these embodiments are not repeated in detail here.

Figure 2:
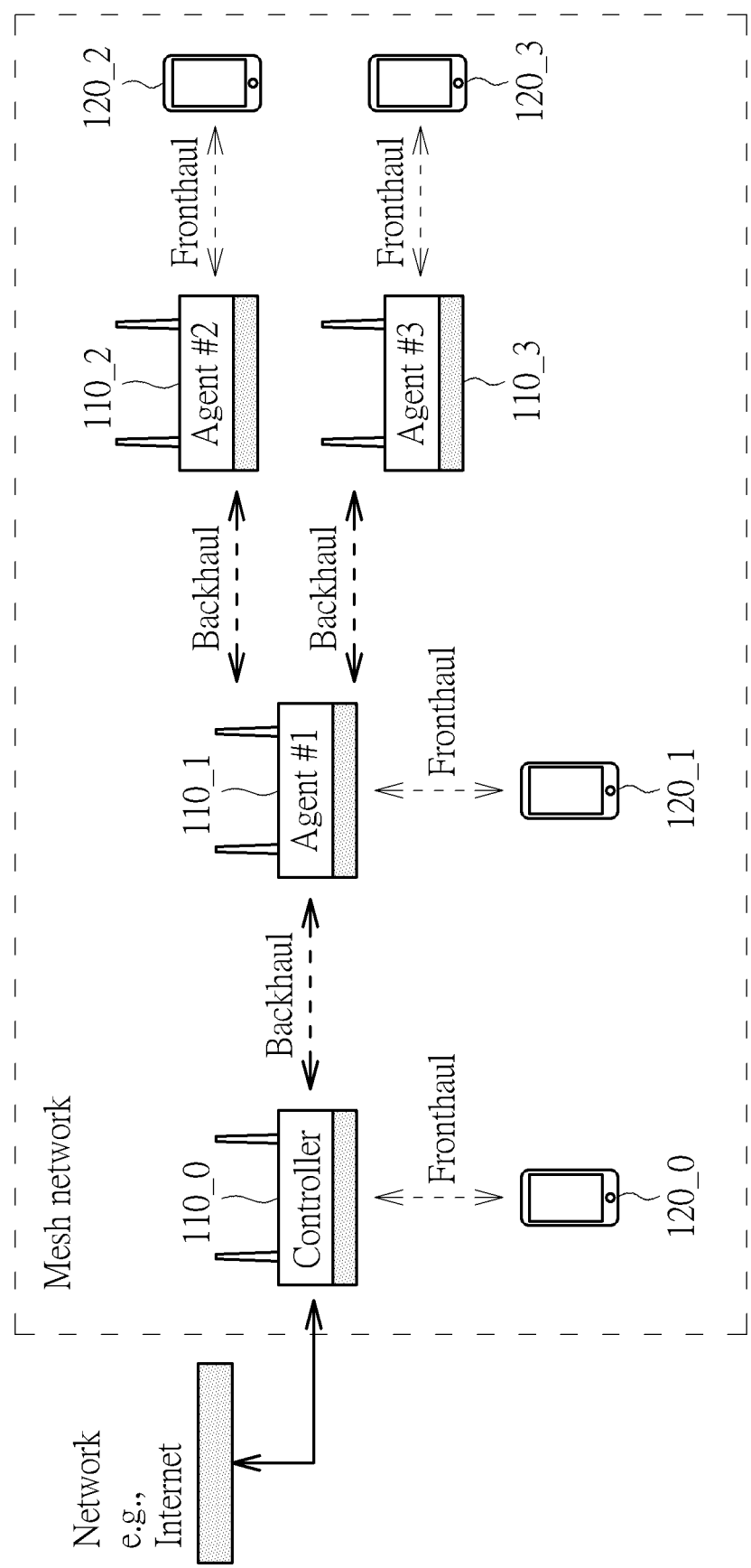
FIG. 2 is a diagram illustrating a mesh control scheme according to an embodiment of the present invention.

FIG. 2 is a diagram illustrating a mesh control scheme according to an embodiment of the present invention, where the multiple AP devices may comprise the AP devices 110_0, 110_1, 110_2 and 110_3, and the multiple STA devices may comprise the STA devices 120_0, 120_1, 120_2 and 120_3. As shown in FIG. 2, the wireless communications system 100 comprising the multiple AP devices such as the AP devices 110_0, 110_1, 110_2 and 110_3 and the multiple STA devices such as the STA devices 120_0, 120_1, 120_2 and 120_3 may be configured as a mesh network, but the present invention is not limited thereto. According to some embodiments, the mesh architecture shown in FIG. 2, the AP device count M and/or the STA device count N may vary. For example, the STA device count N may represent a positive integer.

In the mesh architecture shown in FIG. 2, when a first AP node such as the AP device 110_0 in the wireless communications system 100 is connected to at least one network (e.g., one or more networks) such as the Internet with a wide area network (WAN) port, the first AP node such as the AP device 110_0 may act as a controller of the mesh network. In addition, one or more other AP nodes (e.g., the AP devices 110_1, 110_2 and 110_3) associated to the controller may act as one or more agents of the mesh network. For better comprehension, the AP devices 110_1, 110_2 and 110_3 may act as the agents #1, #2 and #3 of the mesh network, respectively, but the present invention is not limited thereto. Additionally, the mesh AP nodes (e.g., the first AP node and the one or more other AP nodes in the mesh network) such as the AP devices 110_0, 110_1, 110_2 and 110_3 may exchange information and data through backhaul links (labeled "Backhaul" for brevity), and the mesh AP nodes such as the AP devices 110_0, 110_1, 110_2 and 110_3 may communicate with STAs such as the STA devices 120_0, 120_1, 120_2 and 120_3 through fronthaul links (labeled "Fronthaul" for brevity), respectively. For example, all of the fronthaul links may be wireless fronthaul links, and the backhaul links may comprise wired and/or wireless backhaul links, but the present invention is not limited thereto. In some examples, all of the backhaul links may be wireless backhaul links.

Figure 3:
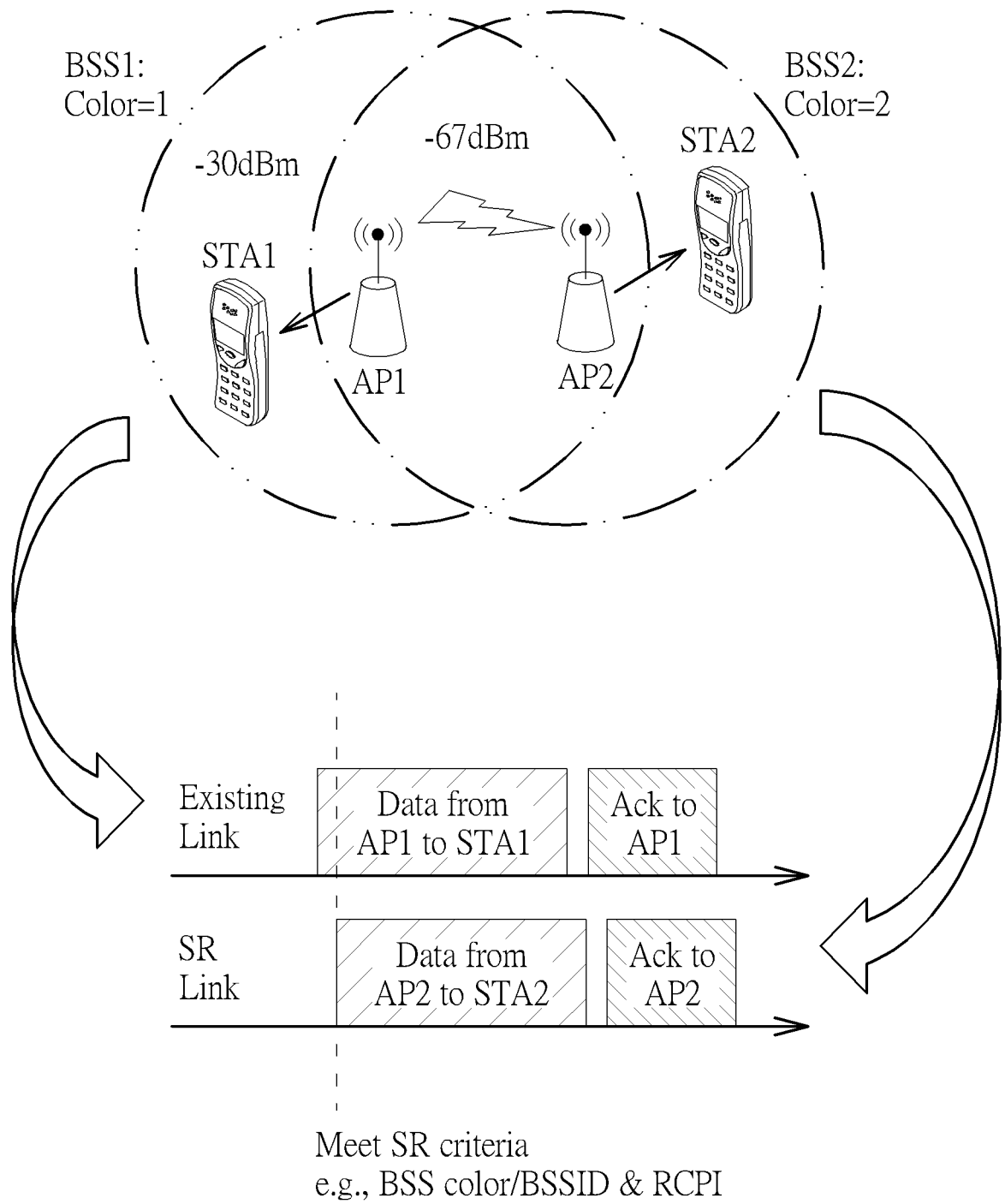
FIG. 3 is a diagram illustrating a Wi-Fi-6-based SR control scheme according to an embodiment of the present invention.

FIG. 3 is a diagram illustrating a Wi-Fi-6-based SR control scheme according to an embodiment of the present invention. For better comprehension, assume that the wireless communications system 100 may operate according to the Wi-Fi-6-based SR control scheme, where the AP devices 110_0 and 110_1 among the multiple AP devices may act as two APs AP1 and AP2 corresponding to two basic service sets (BSSs) BSS1 and BSS2, respectively, and the STA devices 120_0 and 120_1 among the multiple STA devices may act as two STAs STA1 and STA2, but the present invention is not limited thereto. In an existing link between the AP AP1 and the STA STA1, the AP AP1 may send data from the AP AP1 to the STA STA1, and the STA STA1 may send an acknowledgement (Ack) to the AP AP1. The associated traffic may meet predetermined SR criteria (e.g., related to a BSS color or BSS identifier (BSSID), and a received channel power indicator (RCPI)). In this situation, in an SR link, the AP AP2 may send data from the AP AP2 to the STA STA2, and the STA STA2 may send an Ack to the AP AP2.

Figure 4:
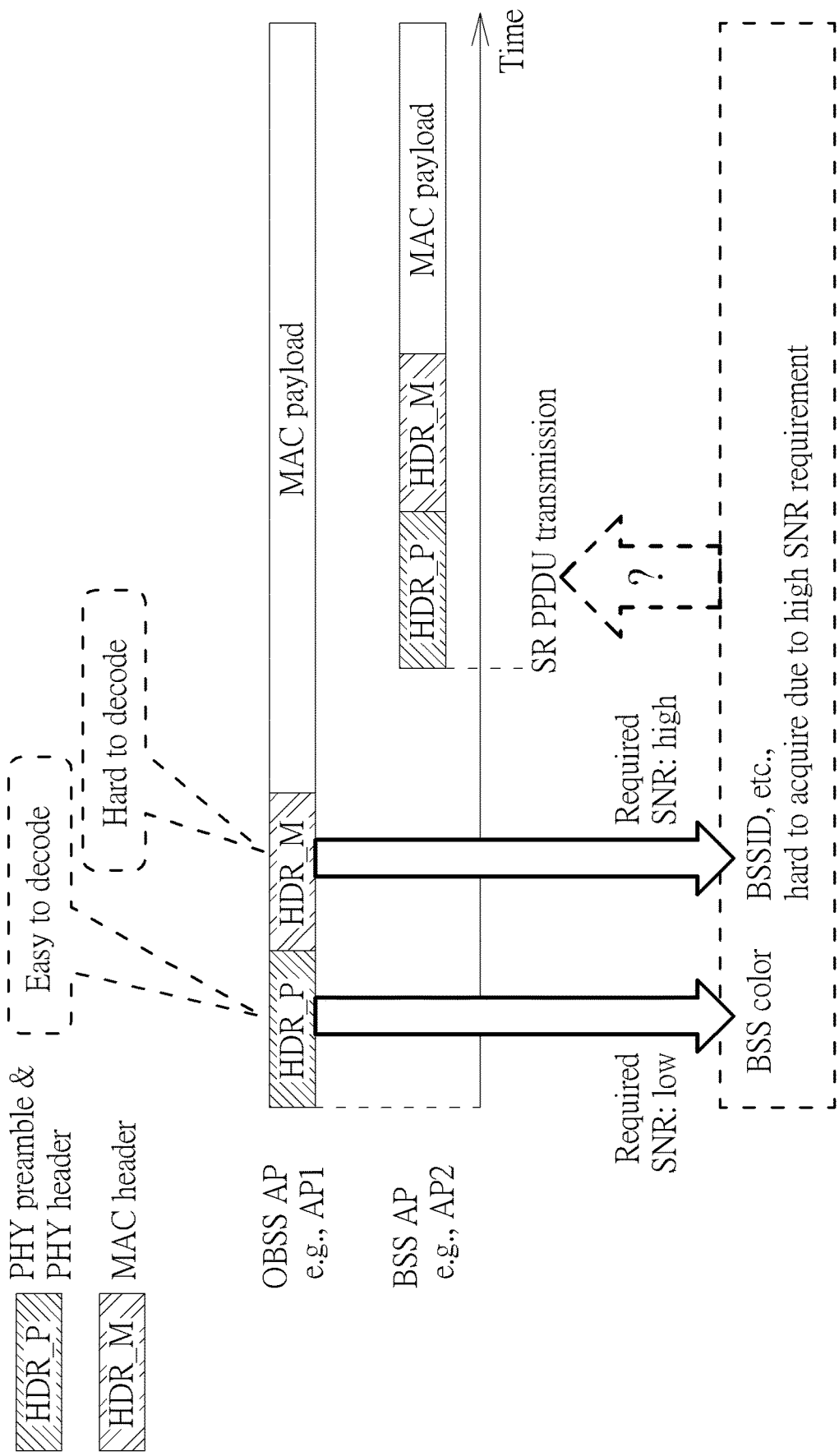
FIG. 4 is a diagram illustrating associated information needed in the Wi-Fi-6-based SR control scheme shown in FIG. 3.

FIG. 4 is a diagram illustrating associated information needed in the Wi-Fi-6-based SR control scheme shown in FIG. 3. For a certain BSS AP such as the AP AP2, a PHY preamble and a PHY header (labeled "HDR_P" for brevity) of a PPDU sent from an overlapping BSS (OBSS) AP such as the AP AP1 may be easy to decode, but a medium access control (MAC) header (labeled "HDR_M" for brevity) of the PPDU sent from the OBSS AP such as the AP AP1, as well as the associated MAC payload in the PPDU, may be hard to decode, where this PPDU is not intended to be sent to the AP AP2 and the power level of this PPDU is typically insufficient for the AP AP2. For example, the required signal-to-noise ratio (SNR) for decoding the PHY preamble and the PHY header of the PPDU is low, so the AP AP2 may successfully decode the PHY preamble of the PPDU to obtain a BSS color from the PHY preamble of this PPDU. In addition, the required SNR for decoding the MAC header of the PPDU is high, so it is hard for the AP AP2 to successfully decode the MAC header of the PPDU to obtain a BSSID, etc. from the MAC header of this PPDU. Before determining whether to perform an SR PPDU transmission, the AP AP2 needs to obtain sufficient information from the PPDU sent from the AP AP1. As the BSSID, etc. in the MAC header of the PPDU is hard to acquire due to the high SNR requirement, the AP AP2 typically does not have sufficient information for the determination (labeled "?" in FIG. 4 for brevity), and it is hard for the AP AP2 to operate correctly in this situation.

Typically, the Wi-Fi-6-based SR control scheme does not work in any mesh architecture. The Wi-Fi-6-based SR control scheme may only consider an AP-to-AP received signal strength indicator (RSSI), without considering any SR signal-to-interference ratio (SIR) on an existing link reception (Rx) end (e.g., the Rx end of the existing link mentioned above). Please note that the mesh internal traffic is not expected to have negative impact from being spatially reused by internal mesh devices, and typically there is no link classification method due to the mesh devices failing to decode the Rx OBSS PPDU transmitter address (TA)/receiver address (RA) under most cases for insufficient Rx signal level. As shown in the following embodiments, the present invention contributes classification methodology for the mesh internal traffic to allow the mesh devices making decision on SR transmission (Tx) availability, where the present invention method and the associated apparatus can mitigate the CCI in the mesh network with aid of SR-related control, and more particularly, maintain coordination of the multiple AP devices to prevent the associated performance (e.g., OBSS performance) from degrading.

Figure 5:
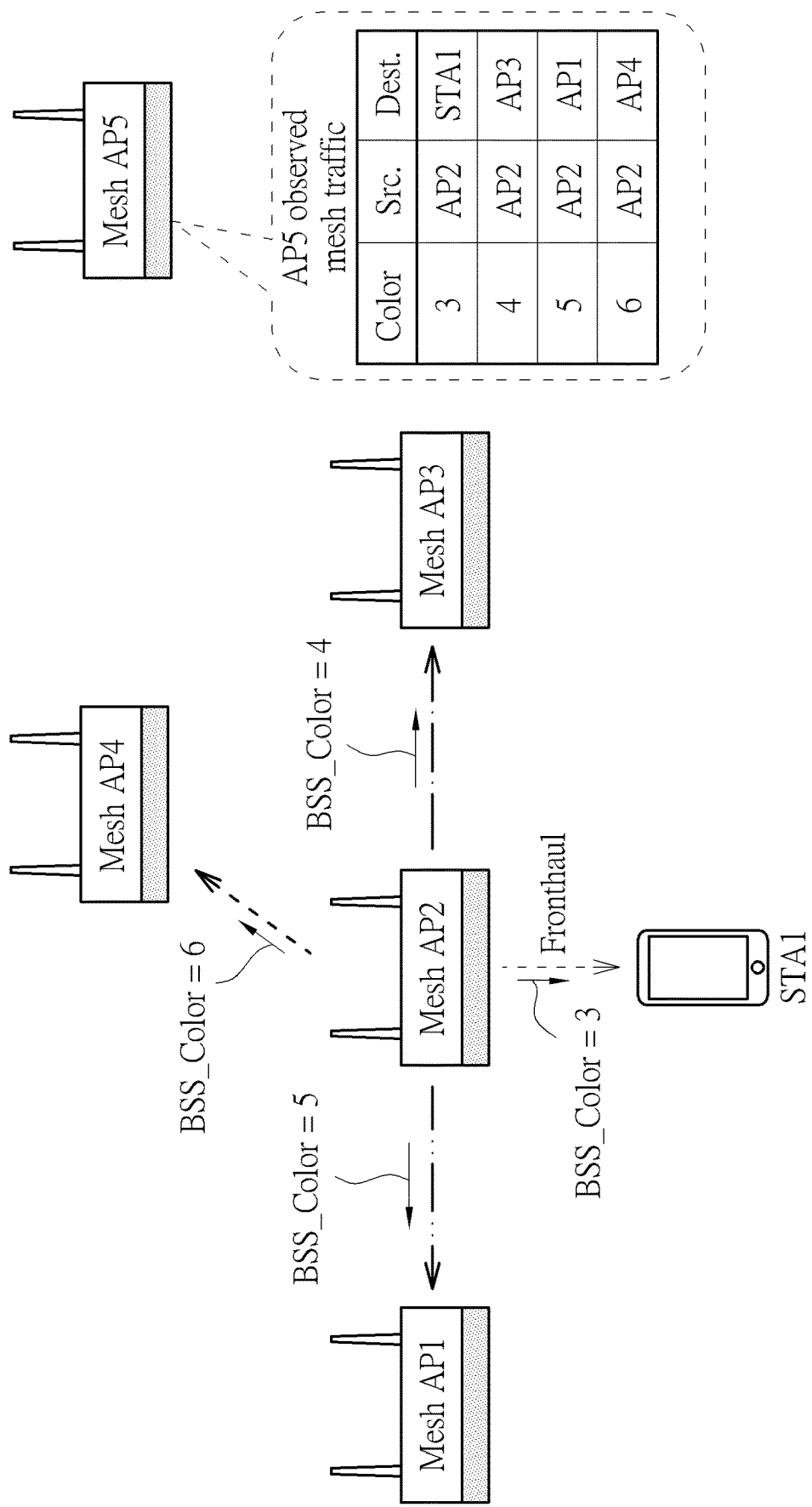
FIG. 5 is a diagram illustrating a first source-destination-relationship-aware SR control scheme of a method for performing mesh control in a wireless communications system according to an embodiment of the present invention.

FIG. 5 is a diagram illustrating a first source-destination-relationship-aware SR control scheme of a method for performing mesh control in a wireless communications system such as the wireless communications system 100 according to an embodiment of the present invention. For better comprehension, the wireless communications system 100 comprising the multiple AP devices such as the AP devices {110_$m$|m=0, . . . , (M−1)} and the multiple STA devices such as the STA devices {120_$n$|n=0, . . . , (N−1)} may be configured as a mesh network. For example, the AP devices 110_0, 110_1, 110_2, 110_3 and 110_4 may act as the mesh AP #1, the mesh AP #2, the mesh AP #3, the mesh AP #4 and the mesh AP #5, respectively, which may be referred to as the mesh AP1, the mesh AP2, the mesh AP3, the mesh AP4 and the mesh AP5 for brevity, respectively, and the STA devices 120_0, etc. may act as the STA #1, etc., respectively, which may be referred to as the STA1, etc. for brevity, respectively, but the present invention is not limited thereto. According to some embodiments, the mesh architecture shown in FIG. 5, the AP device count M and/or the STA device count N may vary. For example, the STA device count N may represent a positive integer.

The method is applicable to any device among a first mesh device, a second mesh device and a third mesh device in the wireless communications system 100, where the first mesh device, the second mesh device and the third mesh device may represent a frame-Tx device (e.g., the mesh AP2), a frame-Rx device (e.g., a certain device among the STA1, the mesh AP1, the mesh AP3 and the mesh AP4) and a source-destination-relationship-aware SR device (e.g., the mesh AP5), respectively. The first mesh device such as the mesh AP2 may be arranged to transmit multiple data transmission frames (e.g., four PPDUs) to the STA1, the mesh AP1, the mesh AP3 and the mesh AP4, respectively, the second mesh device such as the aforementioned certain device among the STA1, the mesh AP1, the mesh AP3 and the mesh AP4 may be arranged to receive one of the multiple data transmission frames (e.g., the four PPDUs) from the first mesh device such as the mesh AP2, and the third mesh device such as the mesh AP5 may be arranged to monitor the multiple data transmission frames (e.g., the four PPDUs) to determine whether to perform an SR transmission operation. For example, operations of the first mesh device (e.g., the mesh AP2), the second mesh device (e.g., the aforementioned certain device among the STA1, the mesh AP1, the mesh AP3 and the mesh AP4) and the third mesh device (e.g., the mesh AP5) may comprise:

(1) the first mesh device may carry a first set of link information in a first preamble (e.g., a PHY preamble) of a first data transmission frame (e.g., a first PPDU among the four PPDUs) transmitted from the first mesh device to the second mesh device, where the first set of link information may comprise at least one indication such as a source-destination relationship indication between the first mesh device and the second mesh device, for indicating a source-destination relationship between the first mesh device and the second mesh device;

(2) the second mesh device may receive the first data transmission frame (e.g., the first PPDU) carrying the first set of link information in the first preamble (e.g., the PHY preamble) and correctly process the first data transmission frame, without being hindered by any SR transmission performed by the third mesh device to another mesh device with respect to the first data transmission frame; and (3) the third mesh device may monitor wireless transmission in the wireless communications system 100 to obtain the first set of link information from the first preamble (e.g., the PHY preamble) of the first data transmission frame (e.g., the first PPDU), and determine SR transmission availability of the third mesh device based on the first set of link information; but the present invention is not limited thereto. According to some embodiments, the aforementioned at least one indication may be arranged for indicating the source-destination relationship between the first mesh device and the second mesh device and/or at least one predicted signal strength of the first data transmission frame at the second mesh device. In addition, the aforementioned at least one indication may be carried in at least one field (e.g., one or more fields) in the PHY preamble, and the aforementioned at least one field may comprise a BSS color field, but the present invention is not limited thereto. According to some embodiments, the aforementioned at least one field may comprise one or a combination of the BSS color field and an SR field in the PHY preamble.

TABLE 1

| BSS_Color | Link type | Source | Destination |
|---|---|---|---|
| 3 | Fronthaul | AP2 | AP2's STA: STA1 |
| 4 | Backhaul Downlink | AP2 | AP3 |
| 5 | Backhaul Uplink | AP2 | AP1 |
| 6 | Backhaul Downlink | AP2 | AP4 |

Table 1 illustrates an example of an indication-to-source-destination mapping table, where the AP5 observed mesh traffic shown in FIG. 5 may correspond to the indication-to-source-destination mapping table shown in Table 1, and may represent the mesh traffic from the source (labeled "Src." for brevity) to the destination (labeled "Dest." for brevity), such as the mesh traffic corresponding to the BSS color value BSS_Color (labeled "Color" for brevity), as observed by the mesh AP5 according to the indication-to-source-destination mapping table shown in Table 1. The first set of link information mentioned above may comprise a first source-destination relationship indication for indicating the source-destination relationship between the first mesh device and the second mesh device, such as a BSS color value BSS_Color carried by the BSS color field in the PHY preamble, and the third mesh device may be arranged to monitor the wireless transmission in the wireless communications system 100 to obtain the first source-destination relationship indication (e.g., the BSS color value BSS_Color) from the first preamble (e.g., the PHY preamble) of the first data transmission frame (e.g., the first PPDU), and determine the SR transmission availability based on the first source-destination relationship indication (e.g., the BSS color value BSS_Color). More particularly, the mesh AP1, the mesh AP2, the mesh AP3, the mesh AP4 and the mesh AP5 may exchange the indication-to-source-destination mapping table shown in Table 1, and at least one device in the wireless communications system 100, such as one or more mesh APs among the mesh AP1, the mesh AP2, the mesh AP3, the mesh AP4 and the mesh AP5, may be arranged to prepare the indication-to-source-destination mapping table in advance to allow the third mesh device such as the mesh AP5 to obtain multiple predetermined source-destination relationships from the indication-to-source-destination mapping table. For example, the multiple predetermined source-destination relationships may comprise:
  (1) the source-destination relationship between the mesh AP2 and the STA1 as illustrated in the first row of Table 1, where BSS_Color=3 may be arranged to indicate this source-destination relationship;
  (2) the source-destination relationship between the mesh AP2 and the mesh AP3 as illustrated in the second row of Table 1, where BSS_Color=4 may be arranged to indicate this source-destination relationship;
  (3) the source-destination relationship between the mesh AP2 and the mesh AP1 as illustrated in the third row of Table 1, where BSS_Color=5 may be arranged to indicate this source-destination relationship; and
  (4) the source-destination relationship between the mesh AP2 and the mesh AP4 as illustrated in the fourth row of Table 1, where BSS_Color=6 may be arranged to indicate this source-destination relationship;
where the source-destination relationship between the first mesh device and the second mesh device may be equal to one of the multiple predetermined source-destination relationships.

Based on multiple preliminarily measured signal strengths of multiple signals from the third mesh device (e.g., the mesh AP5) to different destinations (e.g., the STA1, the mesh AP3, the mesh AP1 and the mesh AP4) in the wireless communications system 100, the third mesh device such as the mesh AP5 may be arranged to determine the SR transmission availability according to the first set of link information, where the second mesh device may be one of the aforementioned different destinations. For example, the multiple preliminarily measured signal strengths of the multiple signals from the third mesh device to the aforementioned different destinations may represent multiple RSSIs of multiple frames from the third mesh device to the aforementioned different destinations, respectively. For better comprehension, assume that:
  (1) the preliminarily measured signal strengths (e.g., the RSSIs) of a first set of signals (e.g., a first set of previously transmitted frames, such as first previously transmitted frames) from the third mesh device to a first set of destinations (e.g., the STA1 and the mesh AP1) among the aforementioned different destinations are less than a predetermined signal strength threshold (e.g., a predetermined RSSI threshold), which may indicate that any device among the first set of destinations (e.g., the STA1 and the mesh AP1) can receive a data transmission frame (e.g., a PPDU) and correctly process this data transmission frame, without being hindered by any SR transmission performed by the mesh AP5 with respect to this data transmission frame; and (2) the preliminarily measured signal strengths (e.g., the RSSIs) of a second set of signals (e.g., a second set of previously transmitted frames, such as second previously transmitted frames) from the third mesh device to a second set of destinations (e.g., the mesh AP3 and the mesh AP4) among the aforementioned different destinations reach (e.g., are greater than or equal to) the predetermined signal strength threshold (e.g., the predetermined RSSI threshold), which may indicate that any device among the second set of destinations (e.g., the mesh AP3 and the mesh AP4) is unable to correctly receive and process a data transmission frame (e.g., a PPDU) if the mesh AP5 performs any SR transmission with respect to this data transmission frame; but the present invention is not limited thereto. For example, when detecting that the first set of link information such as the BSS color value BSS_Color is equal to 3 or 5, the third mesh device such as the mesh AP5 can determine that the second mesh device belongs to the first set of destinations (e.g., the STA1 and the mesh AP1), and perform an SR transmission operation to enhance the overall performance, where the second mesh device can correctly receive and process the first data transmission frame (e.g., the first PPDU), without being hindered by this SR transmission operation. For another example, when detecting that the first set of link information such as the BSS color value BSS_Color is equal to 4 or 6, the third mesh device such as the mesh AP5 can determine that the second mesh device belongs to the second set of destinations (e.g., the mesh AP3 and the mesh AP4), and prevent performing any SR transmission operation at this moment in order to guarantee that the second mesh device can correctly receive and process the first data transmission frame (e.g., the first PPDU), and more particularly, may perform an SR transmission operation at another moment to enhance the overall performance, where re-transmission of the first data transmission frame (e.g., the first PPDU) is not required.

According to this embodiment, the BSS color field in the first preamble (e.g., the PHY preamble) of the first data transmission frame (e.g., the first PPDU) may be arranged to carry the first source-destination relationship indication (e.g., the BSS color value BSS_Color), and more particularly, the respective BSS color fields of the respective PHY preambles of the multiple data transmission frames (e.g., the four PPDUs) from the first mesh device to the aforementioned different destinations may be arranged to carry different BSS color values {BSS_Color} (e.g., BSS_Color=3, BSS_Color=4, BSS_Color=5 and BSS_Color=6 as shown in FIG. 5), where the second mesh device may be one of the aforementioned different destinations, and the first source-destination relationship indication may be a BSS color value BSS_Color corresponding to the second mesh device among the aforementioned different BSS color values {BSS_Color}, but the present invention is not limited thereto. According to some embodiments, the combination of the BSS color field and the SR field in the first preamble (e.g., the PHY preamble) of the first data transmission frame (e.g., the first PPDU) may be arranged to carry the first source-destination relationship indication, and more particularly, the respective BSS color fields of the respective PHY preambles of the multiple data transmission frames (e.g., the four PPDUs) from the first mesh device to the aforementioned different destinations may be arranged to carry a same BSS color value, such as the BSS color value BSS_Color AP2 corresponding to the mesh AP2 (e.g., BSS_Color=BSS_Color AP2), and the respective SR fields of the respective PHY preambles of the multiple data transmission frames (e.g., the four PPDUs) from the first mesh device to the aforementioned different destinations may be arranged to carry different SR-field values {Spatial_Reuse}, where the second mesh device may be one of the aforementioned different destinations, and the first source-destination relationship indication may be a BSS-color-value and SR-field-value set (e.g., a combination of the BSS color value BSS_Color and an SR-field value Spatial_Reuse) corresponding to the second mesh device among multiple predetermined BSS-color-value and SR-field-value sets. For example, any predetermined BSS-color-value and SR-field-value set among the multiple predetermined BSS-color-value and SR-field-value sets may represent a combination of the same BSS color value BSS_Color (e.g., BSS_Color=BSS_Color AP2) and an SR-field value Spatial_Reuse among the aforementioned different SR-field values {Spatial_Reuse}.

Figure 6:
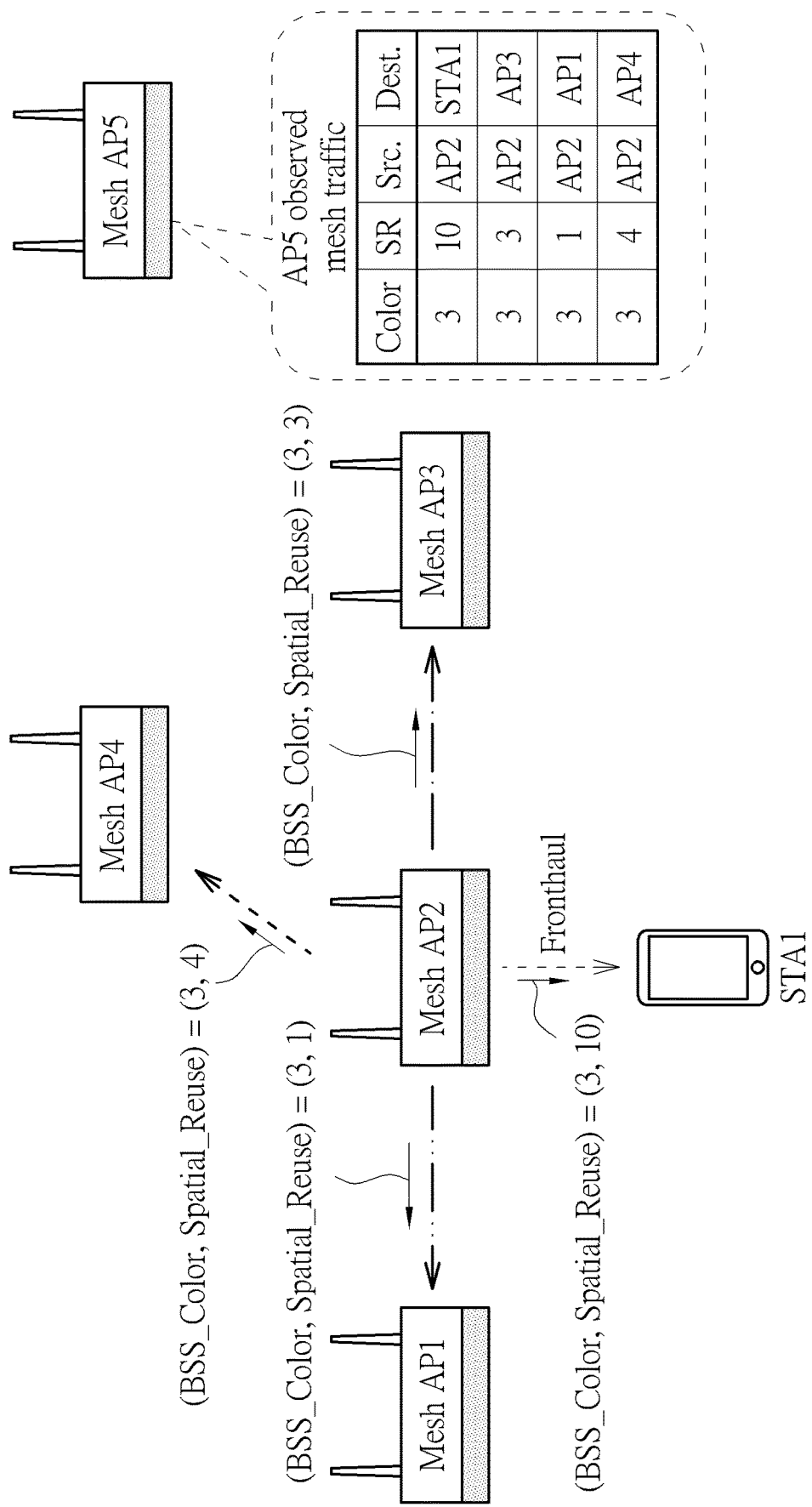
FIG. 6 is a diagram illustrating a second source-destination-relationship-aware SR control scheme of the method according to an embodiment of the present invention.

FIG. 6 is a diagram illustrating a second source-destination-relationship-aware SR control scheme of the method according to an embodiment of the present invention. For better comprehension, the wireless communications system 100 comprising the multiple AP devices such as the AP devices {110_m|m=0, . . . , (M−1)} and the multiple STA devices such as the STA devices {120_n|n=0, . . . , (N−1)} may be configured as a mesh network. For example, the AP devices 110_0, 110_i, 110_2, 110_3 and 110_4 may act as the mesh AP #1, the mesh AP #2, the mesh AP #3, the mesh AP #4 and the mesh AP #5, respectively, which may be referred to as the mesh AP1, the mesh AP2, the mesh AP3, the mesh AP4 and the mesh AP5 for brevity, respectively, and the STA devices 120_0, etc. may act as the STA #1, etc., respectively, which may be referred to as the STA1, etc. for brevity, respectively, but the present invention is not limited thereto. According to some embodiments, the mesh architecture shown in FIG. 6, the AP device count M and/or the STA device count N may vary. For example, the STA device count N may represent a positive integer.

Table 2 illustrates another example of the indication-to-source-destination mapping table, where the APS observed mesh traffic shown in FIG. 6 may correspond to the indication-to-source-destination mapping table shown in Table 2, and may represent the mesh traffic from the source (labeled "Src." for brevity) to the destination (labeled "Dest." for brevity), such as the mesh traffic corresponding to a combination of the BSS color value BSS_Color and the SR-field value Spatial_Reuse (respectively labeled "Color" and "SR" for brevity), as observed by the mesh AP5 according to the indication-to-source-destination mapping table shown in Table 2. The first set of link information mentioned above may comprise the first source-destination relationship indication for indicating the source-destination relationship between the first mesh device and the second mesh device, such as the combination of the BSS color value BSS_Color carried by the BSS color field in the PHY preamble and the SR-field value Spatial_Reuse carried by the SR field in the PHY preamble, and the third mesh device may be arranged to monitor the wireless transmission in the wireless communications system 100 to obtain the first source-destination relationship indication (e.g., the combination of the BSS color value BSS_Color and the SR-field value Spatial_Reuse) from the first preamble (e.g., the PHY preamble) of the first data transmission frame (e.g., the first PPDU), and determine the SR transmission availability based on the first source-destination relationship indication (e.g., the combination of the BSS color value BSS_Color and the SR-field value Spatial_Reuse). More particularly, the mesh APs (e.g., the mesh AP1, the mesh AP2, the mesh AP3, the mesh AP4 and the mesh AP5) in the mesh network may exchange the indication-to-source-destination mapping table shown in Table 2, and at least one device in the wireless communications system 100, such as one or more mesh APs among the mesh AP1, the mesh AP2, the mesh AP3, the mesh AP4 and the mesh AP5, may be arranged to prepare the indication-to-source-destination mapping table in advance to allow the third mesh device such as the mesh AP5 to obtain the multiple predetermined source-destination relationships from the indication-to-source-destination mapping table. For example, the multiple predetermined source-destination relationships may comprise:

(1) the source-destination relationship between the mesh AP2 and the STA1 as illustrated in the first row of Table 2, where (BSS_Color, Spatial_Reuse)=(3, 10) may be arranged to indicate this source-destination relationship;

(2) the source-destination relationship between the mesh AP2 and the mesh AP3 as illustrated in the second row of Table 2, where (BSS_Color, Spatial_Reuse)=(3, 3) may be arranged to indicate this source-destination relationship;

(3) the source-destination relationship between the mesh AP2 and the mesh AP1 as illustrated in the third row of Table 2, where (BSS_Color, Spatial_Reuse)=(3, 1) may be arranged to indicate this source-destination relationship; and (4) the source-destination relationship between the mesh AP2 and the mesh AP4 as illustrated in the fourth row of Table 2, where (BSS_Color, Spatial_Reuse)=(3, 4) may be arranged to indicate this source-destination relationship;

where the source-destination relationship between the first mesh device and the second mesh device may be equal to one of the multiple predetermined source-destination relationships. According to this embodiment, BSS_Color AP2=3, but the present invention is not limited thereto.

TABLE 2

| BSS_Color | Spatial_Reuse | Link type | Source | Destination |
|---|---|---|---|---|
| 3 | 10 | Fronthaul | AP2 | AP2's STA: STA1 |
| 3 | 3 | Backhaul Downlink | AP2 | AP3 |
| 3 | 1 | Backhaul Uplink | AP2 | AP1 |
| 3 | 4 | Backhaul Downlink | AP2 | AP4 |

According to some embodiments, the BSS color value BSS_Color AP2 corresponding to the mesh AP2 may vary. For better comprehension, assume that:

(1) the preliminarily measured signal strengths (e.g., the RSSIs) of the first set of signals (e.g., the first set of previously transmitted frames, such as the first previously transmitted frames) from the third mesh device to the first set of destinations (e.g., the STA1 and the mesh AP1) among the aforementioned different destinations are less than the predetermined signal strength threshold (e.g., the predetermined RSSI threshold), which may indicate that any device among the first set of destinations (e.g., the STA1 and the mesh AP1) can receive a data transmission frame (e.g., a PPDU) and correctly process this data transmission frame, without being hindered by any SR transmission performed by the mesh AP5 with respect to this data transmission frame; and (2) the preliminarily measured signal strengths (e.g., the RSSIs) of the second set of signals (e.g., the second set of previously transmitted frames, such as the second previously transmitted frames) from the third mesh device to the second set of destinations (e.g., the mesh AP3 and the mesh AP4) among the aforementioned different destinations reach (e.g., are greater than or equal to) the predetermined signal strength threshold (e.g., the predetermined RSSI threshold), which may indicate that any device among the second set of destinations (e.g., the mesh AP3 and the mesh AP4) is unable to correctly receive and process a data transmission frame (e.g., a PPDU) if the mesh AP5 performs any SR transmission with respect to this data transmission frame;

but the present invention is not limited thereto. For example, when detecting that the first set of link information (e.g., the first source-destination relationship indication) such as the BSS-color-value and SR-field-value set (BSS_Color, Spatial_Reuse) is equal to any predetermined BSS-color-value and SR-field-value set among the predetermined BSS-color-value and SR-field-value sets (3, 10) and (3, 1), the third mesh device such as the mesh AP5 can determine that the second mesh device belongs to the first set of destinations (e.g., the STA1 and the mesh AP1), and perform an SR transmission operation to enhance the overall performance, where the second mesh device can correctly receive and process the first data transmission frame (e.g., the first PPDU), without being hindered by this SR transmission operation. For another example, when detecting that the first set of link information (e.g., the first source-destination relationship indication) such as the BSS-color-value and SR-field-value set (BSS_Color, Spatial_Reuse) is equal to any predetermined BSS-color-value and SR-field-value set among the predetermined BSS-color-value and SR-field-value sets (3, 3) and (3, 4), the third mesh device such as the mesh AP5 can determine that the second mesh device belongs to the second set of destinations (e.g., the mesh AP3 and the mesh AP4), and prevent performing any SR transmission operation at this moment in order to guarantee that the second mesh device can correctly receive and process the first data transmission frame (e.g., the first PPDU), and more particularly, may perform an SR transmission operation at another moment to enhance the overall performance, where re-transmission of the first data transmission frame (e.g., the first PPDU) is not required. For brevity, similar descriptions for this embodiment are not repeated in detail here.

According to the embodiments respectively shown in FIG. 5 and FIG. 6, the mesh AP1 may be the controller of the mesh network, and the other mesh APs such as the mesh AP2, the mesh AP3, the mesh AP4 and the mesh AP5 may be the agents of the mesh network, where an agent such as the mesh AP2 may be taken as an example of the first mesh device, but the present invention is not limited thereto. According to some embodiments, another mesh AP (e.g., the controller or another agent) may be taken as an example of the first mesh device, any mesh AP among the remaining mesh APs may be taken as an example of the third mesh device, and any device (e.g., any AP device $110\_m$ or any STA device $120\_n$) among the remaining devices in the wireless communications system 100 may be taken as an example of the second mesh device. According to some embodiments, any mesh AP among the mesh APs may be taken as an example of the third mesh device, and any device (e.g., any AP device $110\_m$ or any STA device $120\_n$) among the remaining devices in the wireless communications system 100 may be taken as an example of any mesh device among the first mesh device and the second mesh device.

According to some embodiments, the one or more mesh APs arranged to prepare the indication-to-source-destination mapping table (e.g., the indication-to-source-destination mapping table shown in Table 1 or the indication-to-source-destination mapping table shown in Table 2) in advance may comprise the controller of the mesh network, where the mesh AP1 may be the controller of the mesh network, but the present invention is not limited thereto. According to some embodiments, the one or more mesh APs may vary.

According to some embodiments, at least one mesh control device (e.g., one or more mesh control devices) in the wireless communications system 100, such as the one or more mesh APs, may be arranged to obtain multiple sets of link information among different mesh devices, and the third mesh device may be informed of at least a part of the multiple sets of link information from the aforementioned at least one mesh control device, where the multiple sets of link information may comprise combinations of BSS color information and source-destination information. For example, the multiple sets of link information may be implemented by way of the indication-to-source-destination mapping table (e.g., the indication-to-source-destination mapping table shown in Table 1 or the indication-to-source-destination mapping table shown in Table 2), but the present invention is not limited thereto. As long as implementation of the present invention will not be hindered, the multiple sets of link information may be implemented as any of some other types of data structure. According to some embodiments, the aforementioned at least one mesh control device may comprise one or a combination of the first mesh device and the third mesh device.

Figure 7:
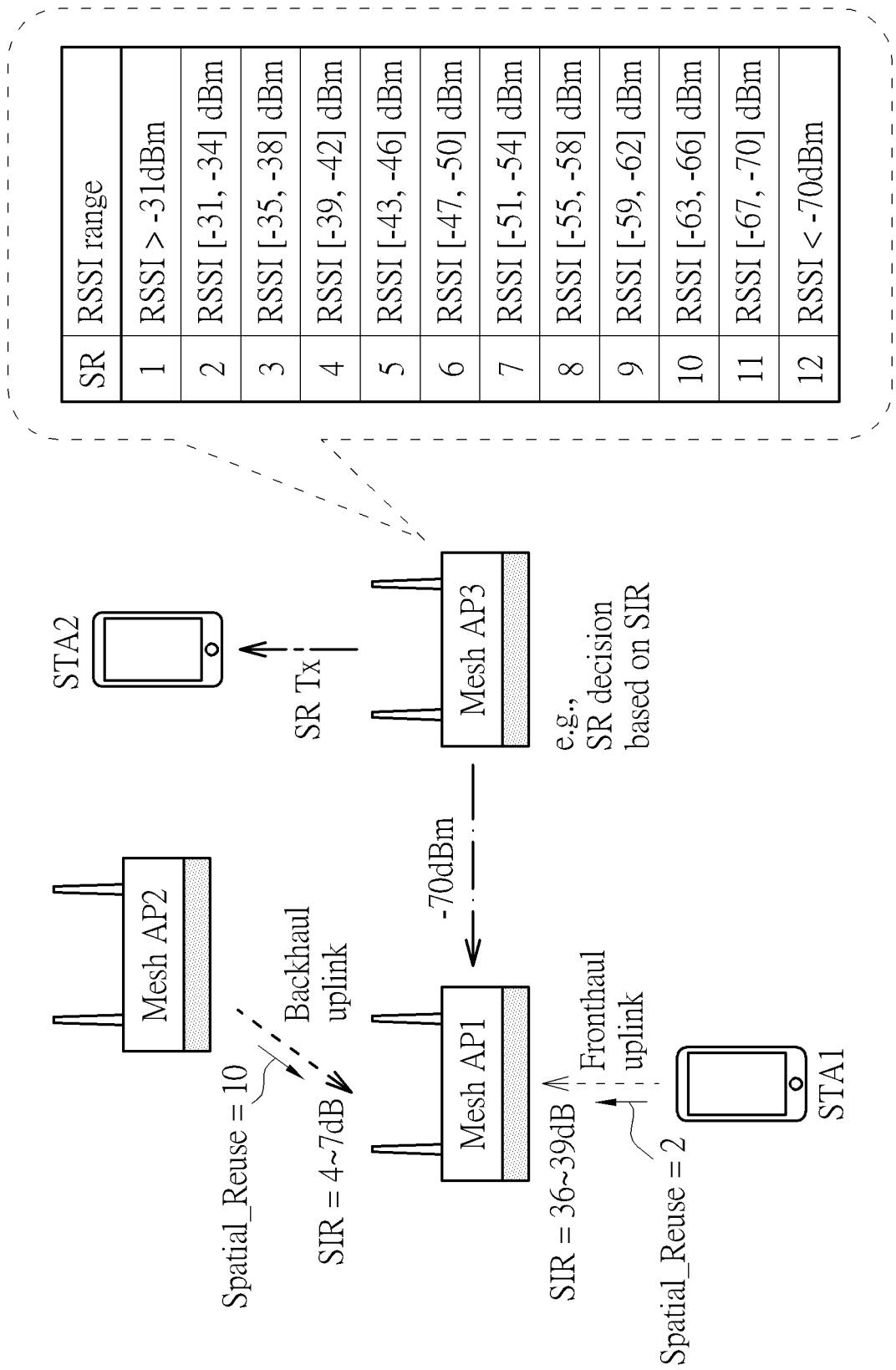
FIG. 7 is a diagram illustrating a signal-strength-aware SR control scheme of the method according to an embodiment of the present invention.

FIG. 7 is a diagram illustrating a signal-strength-aware SR control scheme of the method according to an embodiment of the present invention. For better comprehension, the wireless communications system 100 comprising the multiple AP devices such as the AP devices $\{110\_m|m=0, \ldots, (M-1)\}$ and the multiple STA devices such as the STA devices $\{120\_n|n=0, \ldots, (N-1)\}$ may be configured as a mesh network. For example, the AP devices 110_0, 110_1 and 110_2 may act as the mesh AP #1, the mesh AP #2 and the mesh AP #3, respectively, which may be referred to as the mesh AP1, the mesh AP2 and the mesh AP3 for brevity, respectively, and the STA devices 120_0, 120_1, etc. may act as the STA #1, the STA #2, etc., respectively, which may be referred to as the STA1, STA2, etc. for brevity, respectively, but the present invention is not limited thereto. According to some embodiments, the mesh architecture shown in FIG. 7, the AP device count M and/or the STA device count N may vary. For example, the STA device count N may represent a positive integer.

The method is applicable to any device among the first mesh device, the second mesh device, the third mesh device and a fourth device in the wireless communications system 100, where the first mesh device, the second mesh device, the third mesh device and the fourth device may represent a first frame-Tx device (e.g., the STA1), a frame-Rx device (e.g., the mesh AP1), a signal-strength-aware SR device (e.g., the mesh AP3) and a second frame-Tx device (e.g., the mesh AP2), respectively. The first mesh device such as the STA1 may be arranged to transmit the first data transmission frame (e.g., the first PPDU) among multiple data transmission frames (e.g., two PPDUs) to the mesh AP1, the fourth device such as the mesh AP2 may be arranged to transmit a second data transmission frame (e.g., a second PPDU) among the multiple data transmission frames (e.g., the two PPDUs) to the mesh AP1, the second mesh device such as the mesh AP1 may be arranged to receive the multiple data transmission frames (e.g., the two PPDUs) from the STA1 and the mesh AP2, respectively, and the third mesh device such as the mesh AP3 may be arranged to monitor the multiple data transmission frames (e.g., the two PPDUs) to determine whether to perform an SR transmission operation, respectively. For example, operations of the first mesh device (e.g., the STA1), the second mesh device (e.g., the mesh AP1) and the third mesh device (e.g., the mesh AP3) may comprise:

(1) the first mesh device may carry the first set of link information in the first preamble (e.g., the PHY preamble) of the first data transmission frame (e.g., the first PPDU among the two PPDUs) transmitted from the first mesh device to the second mesh device, where the first set of link information may comprise at least one indication for indicating the aforementioned at least one predicted signal strength (e.g., one or more predicted signal strengths, such as a first RSSI range) of the first data transmission frame (e.g., the first PPDU) at the second mesh device;

(2) the second mesh device may receive the first data transmission frame (e.g., the first PPDU) carrying the first set of link information in the first preamble (e.g., the PHY preamble) and correctly process the first data transmission frame, without being hindered by any SR transmission performed by the third mesh device to another mesh device with respect to the first data transmission frame; and (3) the third mesh device may monitor wireless transmission in the wireless communications system 100 to obtain the first set of link information from the first preamble (e.g., the PHY preamble) of the first data transmission frame (e.g., the first PPDU), and determine the SR transmission availability of the third mesh device based on the first set of link information; where the aforementioned at least one predicted signal strength of the first data transmission frame (e.g., the first PPDU) at the second mesh device may comprise a signal strength (e.g., a preliminarily measured signal strength) of a previous frame sent from the first mesh device to the second mesh device, but the present invention is not limited thereto. For another example, operations of the fourth device (e.g., the mesh AP2), the second mesh device (e.g., the mesh AP1), the third mesh device (e.g., the mesh AP3) and may comprise:

(1) the four device may carry a second set of link information in a second preamble (e.g., a PHY preamble) of the second data transmission frame (e.g., the second PPDU among the two PPDUs), and send the second data transmission frame from the fourth device to the second mesh device, where the second set of link information may comprise at least one indication for indicating at least one predicted signal strength (e.g., one or more predicted signal strengths, such as a second RSSI range) of the second data transmission frame (e.g., the second PPDU) at the second mesh device;

(2) the second mesh device may receive the second data transmission frame (e.g., the second PPDU) carrying the second set of link information in the second preamble (e.g., the PHY preamble) and correctly process the second data transmission frame, without being hindered by any SR transmission performed by the third mesh device to another mesh device with respect to the second data transmission frame; and (3) the third mesh device may monitor wireless transmission in the wireless communications system 100 to obtain the second set of link information from the second preamble (e.g., the PHY preamble) of the second data transmission frame (e.g., the second PPDU), and determine the SR transmission availability of the third mesh device based on the second set of link information; where the aforementioned at least one predicted signal strength of the second data transmission frame (e.g., the second PPDU) at the second mesh device may comprise a signal strength (e.g., a preliminarily measured signal strength) of a previous frame sent from the fourth device to the second mesh device, but the present invention is not limited thereto.

TABLE 3

| Spatial_Reuse | RSSI range (Tx power − Path-loss) |
| --- | --- |
| 0 | *Spec defined* |
| 1 | RSSI > −31 dBm |
| 2 | RSSI [−31, −34] dBm |
| 3 | RSSI [−35, −38] dBm |
| 4 | RSSI [−39, −42] dBm |
| 5 | RSSI [−43, −46] dBm |
| 6 | RSSI [−47, −50] dBm |
| 7 | RSSI [−51, −54] dBm |
| 8 | RSSI [−55, −58] dBm |
| 9 | RSSI [−59, −62] dBm |
| 10 | RSSI [−63, −66] dBm |
| 11 | RSSI [−67, −70] dBm |
| 12 | RSSI < −70 dBm |
| *13* | *Spec defined* |
| *14* | *Spec defined* |
| *15* | *Spec defined* |

Table 3 illustrates an example of an indication-to-signal-strength mapping table, where some table contents written in italic, such as the values {0, 13, 14, 15} with certain spec-defined meanings (labeled "Spec defined" for brevity), may also be listed in Table 3 for better comprehension, but the present invention is not limited thereto. According to some embodiments, the table contents shown in Table 3 may vary. For example, one or more RSSI ranges among the RSSI ranges respectively corresponding to the values {1, 2, 3, 4, 5, 6, 7, 8, 9, 10, 11, 12} may vary. For another example, the table contents written in italic as shown in Table 3 may be omitted. In addition, the first set of link information mentioned above may comprise a first destination-side signal strength indication for indicating the aforementioned at least one predicted signal strength (e.g., the first RSSI range) of the first data transmission frame (e.g., the first PPDU) at the second mesh device, and the second set of link information mentioned above may comprise a second destination-side signal strength indication for indicating the aforementioned at least one predicted signal strength (e.g., the second RSSI range) of the second data transmission frame (e.g., the second PPDU) at the second mesh device. More particularly, any destination-side signal strength indication among the first destination-side signal strength indication carried by the SR field in the PHY preamble of the first PPDU and the second destination-side signal strength indication carried by the SR field in the PHY preamble of the second PPDU may be an SR-field value Spatial_Reuse (labeled "SR" in FIG. 7 for brevity) for indicating an RSSI range among multiple predetermined RSSI ranges, where the SR-field value Spatial_Reuse may be equal to any value among multiple integer values in a predetermined interval [1, 12]. For example, the multiple predetermined RSSI ranges may comprise:

(1) the RSSI range of RSSIs greater than −31 decibel-milliwatts (dBm), where Spatial_Reuse=1 may indicate this RSSI range;
(2) the RSSI range of RSSIs from −31 dBm to −34 dBm, where Spatial_Reuse=2 may indicate this RSSI range;
(3) the RSSI range of RSSIs from −35 dBm to −38 dBm, where Spatial_Reuse=3 may indicate this RSSI range;
(4) the RSSI range of RSSIs from −39 dBm to −42 dBm, where Spatial_Reuse=4 may indicate this RSSI range;
(5) the RSSI range of RSSIs from −43 dBm to −46 dBm, where Spatial_Reuse=5 may indicate this RSSI range;
(6) the RSSI range of RSSIs from −47 dBm to −50 dBm, where Spatial_Reuse=6 may indicate this RSSI range;
(7) the RSSI range of RSSIs from −51 dBm to −54 dBm, where Spatial_Reuse=7 may indicate this RSSI range;
(8) the RSSI range of RSSIs from −55 dBm to −58 dBm, where Spatial_Reuse=8 may indicate this RSSI range;
(9) the RSSI range of RSSIs from −59 dBm to −62 dBm, where Spatial_Reuse=9 may indicate this RSSI range;
(10) the RSSI range of RSSIs from −63 dBm to −66 dBm, where Spatial_Reuse=10 may indicate this RSSI range;
(11) the RSSI range of RSSIs from −67 dBm to −70 dBm, where Spatial_Reuse=11 may indicate this RSSI range;
(12) the RSSI range of RSSIs less than −70 dBm, where Spatial_Reuse=12 may indicate this RSSI range;

where the RSSI range may be regarded as the Tx power minus the path-loss (labeled "Tx power—Path-loss" for brevity), but the present invention is not limited thereto.

The third mesh device such as the mesh AP3 may be arranged to monitor the wireless transmission in the wireless communications system 100 to obtain the first destination-side signal strength indication (e.g., Spatial_Reuse=2, indicating the first RSSI range) from the first preamble (e.g., the PHY preamble) of the first data transmission frame (e.g., the first PPDU). Similarly, the third mesh device may be arranged to monitor the wireless transmission in the wireless communications system 100 to obtain the second destination-side signal strength indication (e.g., Spatial_Reuse=10, indicating the second RSSI range) from the second preamble (e.g., the PHY preamble) of the second data transmission frame (e.g., the second PPDU). In addition, the third mesh device may be arranged to determine the SR transmission availability of the third mesh device based on the first destination-side signal strength indication (e.g., Spatial_Reuse=2, indicating the first RSSI range), and more particularly, calculate a SIR on the associated existing link Rx end (e.g., the Rx end of the existing link, such as the second mesh device receiving the first data transmission frame) according to the first destination-side signal strength indication and determine the SR transmission availability of the third mesh device according to the SIR (labeled "SR decision based on SIR" for brevity), but the present invention is not limited thereto. For example, the third mesh device may be arranged to determine the SR transmission availability of the third mesh device with respect to data transmission frames (e.g., PPDUs) of different links based on the first destination-side signal strength indication (e.g., Spatial_Reuse=2, indicating the first RSSI range) and the second destination-side signal strength indication (e.g., Spatial_Reuse=10, indicating the second RSSI range), respectively, and more particularly, calculate multiple SIRs on the associated existing link Rx end (e.g., the Rx end of the existing links, such as the second mesh device receiving the first data transmission frame and the second data transmission frame) according to the first destination-side signal strength indication and the second destination-side signal strength indication, respectively, and determine the SR transmission availability of the third mesh device according to the multiple SIRs, respectively.

According to the embodiment shown in FIG. 7, the mesh AP1 may be the controller of the mesh network, and the other mesh APs such as the mesh AP2 and the mesh AP3 may be the agents of the mesh network, where a STA such as the STA1 may be taken as an example of the first mesh device, but the present invention is not limited thereto. According to some embodiments, a mesh AP (e.g., the controller or an agent) may be taken as an example of the first mesh device, any mesh AP among the remaining mesh APs may be taken as an example of the third mesh device, and any device (e.g., any AP device 110_m or any STA device 120_n) among the remaining devices in the wireless communications system 100 may be taken as an example of the second mesh device. According to some embodiments, a mesh AP (e.g., the controller or an agent) may be taken as an example of the third mesh device, and any device (e.g., any AP device 110_m or any STA device 120_n) among the remaining devices in the wireless communications system 100 may be taken as an example of any mesh device among the first mesh device and the second mesh device.

According to some embodiments, the mesh APs (e.g., the mesh AP1, the mesh AP2 and the mesh AP3) in the mesh network may exchange the indication-to-signal-strength mapping table shown in Table 3, and at least one device in the wireless communications system 100, such as one or more mesh APs among the mesh AP1, the mesh AP2 and the mesh AP3, may be arranged to prepare the indication-to-signal-strength mapping table in advance to allow the third mesh device such as the mesh AP3 to obtain the aforementioned at least one predicted signal strength of the first data transmission frame (e.g., the first PDDU) and the aforementioned at least one predicted signal strength of the second data transmission frame (e.g., the second PDDU) from the indication-to-signal-strength mapping table. For example, the one or more mesh APs arranged to prepare the indication-to-signal-strength mapping table (e.g., the indication-to-signal-strength mapping table shown in Table 3) in advance may comprise the controller of the mesh network, where the mesh AP1 may be the controller of the mesh network, but the present invention is not limited thereto. According to some embodiments, the one or more mesh APs may vary.

Figure 8:
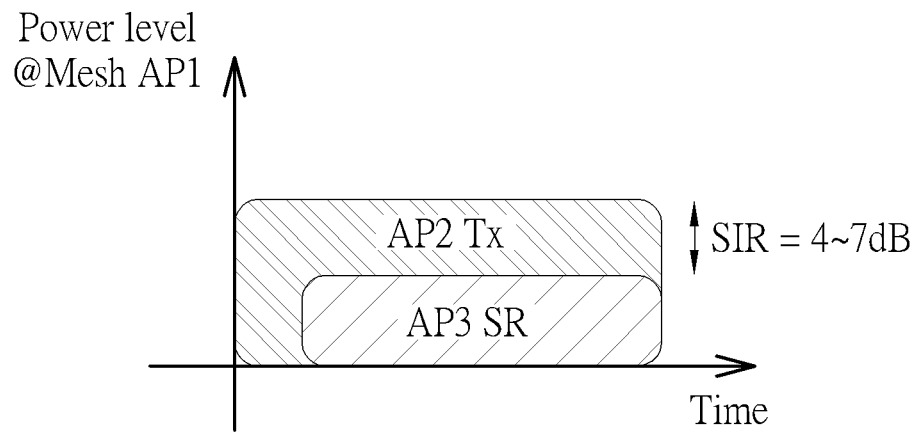
FIG. 8 is a diagram illustrating associated power levels and associated signal-to-interference ratios (SIRs) at the Rx ends of some existing links in the signal-strength-aware SR control scheme shown in FIG. 7 according to an embodiment of the present invention.
Figure 8:
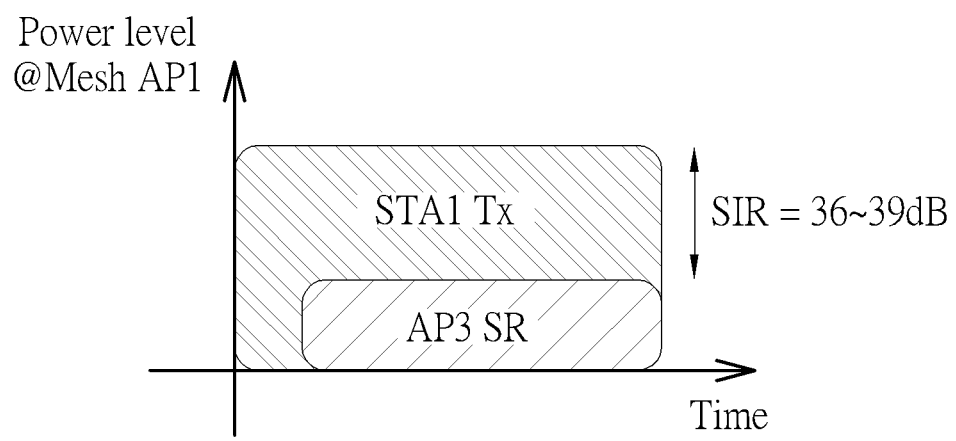

FIG. 8 is a diagram illustrating associated power levels and associated SIRs at the Rx ends of some existing links in the signal-strength-aware SR control scheme shown in FIG. 7 according to an embodiment of the present invention. The third mesh device such as the mesh AP3 may be arranged to determine the SR transmission availability regarding whether to perform SR transmission to another mesh device such as the STA2 with respect to the first data transmission frame (e.g., the first PPDU) and the second data transmission frame (e.g., the second PPDU) according to the first destination-side signal strength indication (e.g., Spatial_Reuse=2, indicating the first RSSI range) and the second destination-side signal strength indication (e.g., Spatial_Reuse=10, indicating the second RSSI range), respectively. For better comprehension, a preliminarily measured signal strength (e.g., expressed with the RSSI) of a previous frame sent from the mesh AP3 to the mesh AP1 may be equal to −70 dBm, but the present invention is not limited thereto.

For example, as shown in the upper half of FIG. 8, when obtaining the second destination-side signal strength indication (e.g., Spatial_Reuse=10, indicating the second RSSI range), the mesh AP3 may detect that the AP2-to-AP1 RSSI such as the power level of the AP2 transmission (Tx) at the mesh AP1 (labeled "@Mesh AP1" in for brevity) is in the RSSI range of RSSIs from −63 dBm to −66 dBm, and calculate the SR impact on the mesh AP1, such as the power level of the AP3 SR transmission (labeled "AP3 SR" for brevity) at the mesh AP1, to generate the associated SIR SIR(Spatial_Reuse=10) corresponding to Spatial_Reuse=10, where the SIR SIR(Spatial_Reuse=10) may be in the SIR range of SIRs from 4 decibel (dB) to 7 dB (labeled "SIR=4~7 dB" for brevity).

For another example, as shown in the lower half of FIG. 8, when obtaining the first destination-side signal strength indication (e.g., Spatial_Reuse=2, indicating the first RSSI range), the mesh AP3 may detect that the STA1-to-AP1 RSSI such as the power level of the STA1 transmission (Tx) at the mesh AP1 (labeled "@Mesh AP1" for brevity) is in the RSSI range of RSSIs from −31 dBm to −34 dBm, and calculate the SR impact on the mesh AP1, such as the power level of the AP3 SR transmission (labeled "AP3 SR" for brevity) at the mesh AP1, to generate the associated SIR SIR(Spatial_Reuse=2) corresponding to Spatial_Reuse=2, where the SIR SIR(Spatial_Reuse=2) may be in the SIR range of SIRs from 36 dB to 39 dB (labeled "SIR=36~39 dB" for brevity).

After obtaining the SIR SIR(Spatial_Reuse=2) and the SIR SIR(Spatial_Reuse=10) (e.g., the SIR SIR(Spatial_Reuse=2) corresponding to Spatial_Reuse=2 is greater than the SIR SIR(Spatial_Reuse=10) corresponding to Spatial_Reuse=10), the mesh AP3 may have sufficient information for determining whether to perform SR transmission to the other mesh device such as the STA2 with respect to a subsequent first data transmission frame (e.g., a subsequent first PPDU sent from the STA1 to the mesh AP1) and determining whether to perform SR transmission to the other mesh device such as the STA2 with respect to a subsequent second data transmission frame (e.g., a subsequent second PPDU sent from the mesh AP2 to the mesh AP1). For example, based on the SIR SIR(Spatial_Reuse=2) corresponding to Spatial_Reuse=2, the mesh AP3 may perform SR transmission to the other mesh device such as the STA2 with respect to the subsequent first data transmission frame (e.g., the subsequent first PPDU sent from the STA1 to the mesh AP1). For another example, based on the SIR SIR(Spatial_Reuse=10) corresponding to Spatial_Reuse=10, the mesh AP3 may prevent performing SR transmission to the other mesh device such as the STA2 with respect to the subsequent second data transmission frame (e.g., the subsequent second PPDU sent from the mesh AP2 to the mesh AP1). For brevity, similar descriptions for this embodiment are not repeated in detail here.

According to some embodiments, the third mesh device may be arranged to determine the SR transmission availability of the third mesh device at a first time point according to the first destination-side signal strength indication (e.g., Spatial_Reuse=2, indicating the first RSSI range) and a predetermined destination-side signal strength threshold Th_RSSI, and determine the SR transmission availability of the third mesh device at a second time point according to the second destination-side signal strength indication (e.g., Spatial_Reuse=10, indicating the second RSSI range) and the predetermined destination-side signal strength threshold Th_RSSI. For example, if the first RSSI range RSSI_range1 indicated by the first destination-side signal strength indication reaches the predetermined destination-side signal strength threshold Th_RSSI (e.g., RSSI_range1>Th_RSSI), the third mesh device may perform an SR transmission operation with respect to the first data transmission frame (e.g., the first PPDU); otherwise (e.g., RSSI_range1<Th_RSSI), the third mesh device may prevent performing any SR transmission operation with respect to the first data transmission frame (e.g., the first PPDU). Similarly, if the second RSSI range RSSI_range2 indicated by the second destination-side signal strength indication reaches the predetermined destination-side signal strength threshold Th_RSSI (e.g., RSSI_range2>Th_RSSI), the third mesh device may perform an SR transmission operation with respect to the second data transmission frame (e.g., the second PPDU); otherwise (e.g., RSSI_range2<Th_RSSI), the third mesh device may prevent performing any SR transmission operation with respect to the second data transmission frame (e.g., the second PPDU). For brevity, similar descriptions for these embodiments are not repeated in detail here.

According to some embodiments, the third mesh device may be arranged to determine the SR transmission availability of the third mesh device at the first time point according to the first destination-side signal strength indication (e.g., Spatial_Reuse=2, indicating the first RSSI range) and a predetermined destination-side signal strength indication threshold Th_Spatial_Reuse, and determine the SR transmission availability of the third mesh device at the second time point according to the second destination-side signal strength indication (e.g., Spatial_Reuse=10, indicating the second RSSI range) and the predetermined destination-side signal strength indication threshold Th_Spatial_Reuse. For example:

(1) if the first destination-side signal strength indication does not reach the predetermined destination-side signal strength indication threshold Th_Spatial_Reuse (e.g., Spatial_Reuse<Th_Spatial_Reuse), the third mesh device may perform an SR transmission operation with respect to the first data transmission frame (e.g., the first PPDU), otherwise (e.g., Spatial_Reuse≥Th_Spatial_Reuse), the third mesh device may prevent performing any SR transmission operation with respect to the first data transmission frame (e.g., the first PPDU); and (2) if the second destination-side signal strength indication does not reach the predetermined destination-side signal strength indication threshold Th_Spatial_Reuse (e.g., Spatial_Reuse <Th_Spatial_Reuse), the third mesh device may perform an SR transmission operation with respect to the second data transmission frame (e.g., the second PPDU), otherwise (e.g., Spatial_Reuse≥Th_Spatial_Reuse), the third mesh device may prevent performing any SR transmission operation with respect to the second data transmission frame (e.g., the second PPDU);
but the present invention is not limited thereto. For brevity, similar descriptions for these embodiments are not repeated in detail here.

According to some embodiments, the RSSI ranges respectively corresponding to the values {1, 2, 3, 4, 5, 6, 7, 8, 9, 10, 11, 12} as shown in Table 3 may be re-arranged in a reverse order. For example:
  (1) if the first destination-side signal strength indication reaches the predetermined destination-side signal strength indication threshold Th_Spatial_Reuse (e.g., Spatial_Reuse≥Th_Spatial_Reuse), the third mesh device may perform an SR transmission operation with respect to the first data transmission frame (e.g., the first PPDU), otherwise (e.g., Spatial_Reuse <Th_Spatial_Reuse), the third mesh device may prevent performing any SR transmission operation with respect to the first data transmission frame (e.g., the first PPDU); and
  (2) if the second destination-side signal strength indication reaches the predetermined destination-side signal strength indication threshold Th_Spatial_Reuse (e.g., Spatial_Reuse≥Th_Spatial_Reuse), the third mesh device may perform an SR transmission operation with respect to the second data transmission frame (e.g., the second PPDU), otherwise (e.g., Spatial_Reuse <Th_Spatial_Reuse), the third mesh device may prevent performing any SR transmission operation with respect to the second data transmission frame (e.g., the second PPDU);
  but the present invention is not limited thereto. For brevity, similar descriptions for these embodiments are not repeated in detail here.

According to some embodiments, any PPDU among the PPDUs of the embodiments described above, such as the first PPDU, the second PPDU, any of the four PPDUs, any of the two PPDUs, etc., may be implemented by way of high efficiency (HE) single user (SU) PPDU, HE multi-user (MU) PPDU, extremely high throughput (EHT) SU PPDU or EHT MU PPDU. For brevity, similar descriptions for these embodiments are not repeated in detail here.

According to some embodiments, any frame among the data transmission frames of the embodiments described above, such as the first data transmission frame, the second data transmission frame, any of the multiple data transmission frames, etc., may be a non-trigger-based (non-TB) frame such as a frame which is not a trigger-based (TB) frame. More particularly, the aforementioned any PPDU such as the first PPDU, the second PPDU, any of the four PPDUs, any of the two PPDUs, etc. may be a non-TB PPDU such as a PPDU which is not a TB PPDU. For brevity, similar descriptions for these embodiments are not repeated in detail here.

Figure 9:
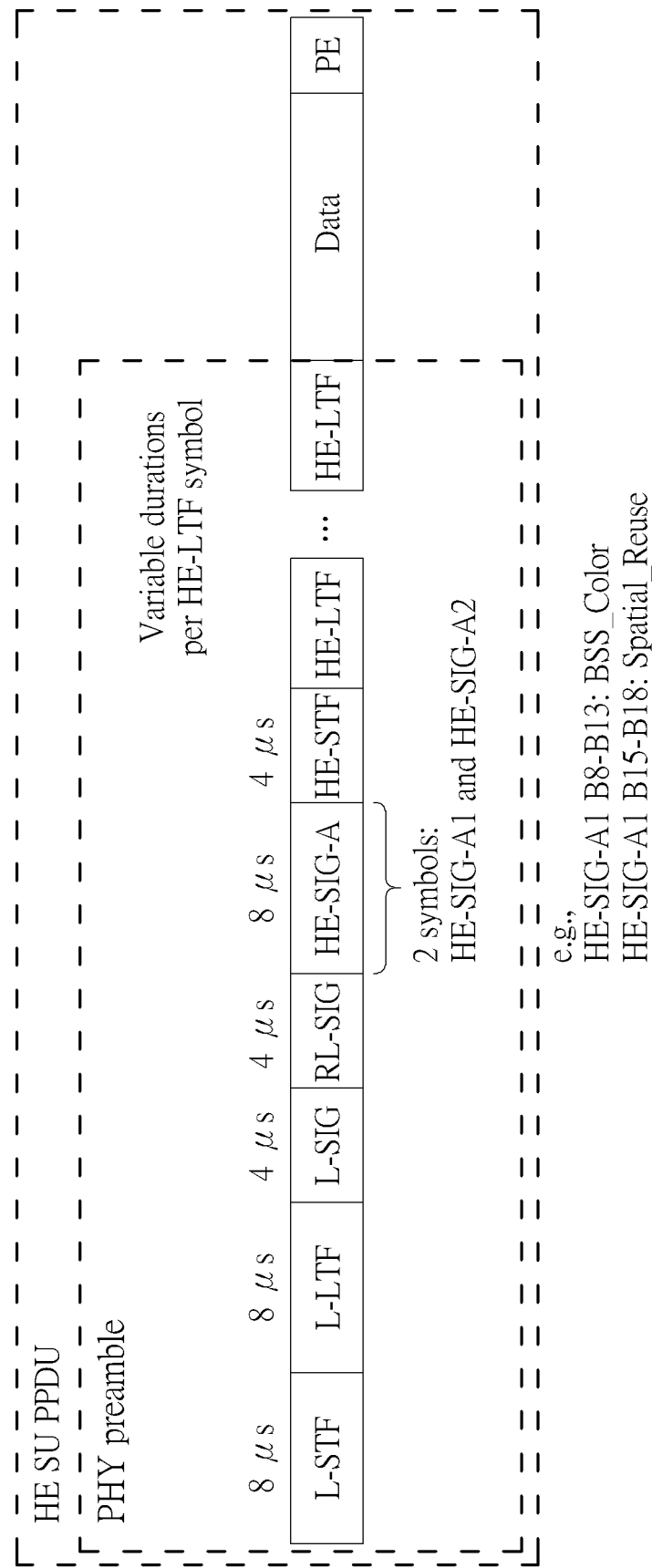
FIG. 9 is a diagram illustrating a first PPDU format involved with the method according to an embodiment of the present invention.

FIG. 9 is a diagram illustrating a first PPDU format involved with the method according to an embodiment of the present invention, where the first PPDU format may represent the format of the HE SU PPDU. For example, at least one portion (e.g., a portion or all) of the PPDUs in the embodiments described above, such as the first PPDU, the second PPDU, the four PPDUs, the two PPDUs, etc., may be implemented by way of the HE SU PPDU shown in FIG. 9. The PHY preamble in the HE SU PPDU may comprise multiple fields {L-STF, L-LTF, L-SIG, RL-SIG, HE-SIG-A, HE-STF, HE-LTF, HE-LTF} with predetermined durations (e.g., 8 microseconds (11s) for each of the fields {L-STF, L-LTF, HE-SIG-A}, and 4 μs for each of the fields {L-SIG, RL-SIG, RE-STF}) and variable durations per HE-LTF symbol, and the HE SU PPDU may further comprise a data field arranged to carry data and another field such as PE, where the field HE-SIG-A may carry two symbols such as HE-SIG-A1 and HE-SIG-A2. For example, Bits 8-13 of the symbol HE-SIG-A1 may be arranged to carry the BSS color value BSS_Color (labeled "HE-SIG-A1 B8-B13: BSS_Color" for brevity), and Bits 15-18 of the symbol HE-SIG-A1 may be arranged to carry the SR-field value Spatial_Reuse (labeled "HE-SIG-A1 B15-B18: Spatial_Reuse" for brevity).

Figure 10:
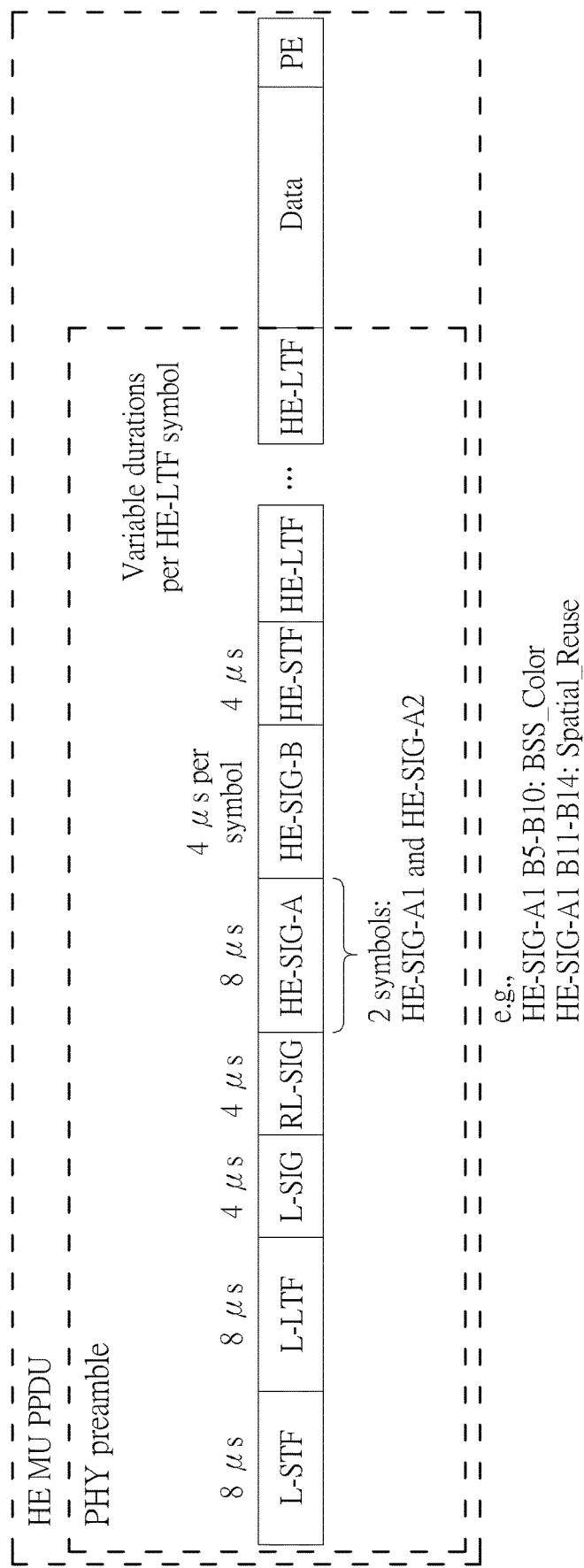
FIG. 10 is a diagram illustrating a second PPDU format involved with the method according to an embodiment of the present invention.

FIG. 10 is a diagram illustrating a second PPDU format involved with the method according to an embodiment of the present invention, where the second PPDU format may represent the format of the HE MU PPDU. For example, at least one portion (e.g., a portion or all) of the PPDUs in the embodiments described above, such as the first PPDU, the second PPDU, the four PPDUs, the two PPDUs, etc., may be implemented by way of the HE MU PPDU shown in FIG. 10. The PHY preamble in the HE MU PPDU may comprise multiple fields {L-STF, L-LTF, L-SIG, RL-SIG, HE-SIG-A, HE-SIG-B, HE-STF, HE-LTF, . . . , HE-LTF} with predetermined durations (e.g., 8 μs for each of the fields {L-STF, L-LTF, HE-SIG-A}, 4 μs for each of the fields {L-SIG, RL-SIG, HE-STF}, and 4 μs per symbol for the field HE-SIG-B) and variable durations per HE-LTF symbol, and the HE MU PPDU may further comprise a data field arranged to carry data and another field such as PE, where the field HE-SIG-A may carry two symbols such as HE-SIG-A1 and HE-SIG-A2. For example, Bits 5-10 of the symbol HE-SIG-A1 may be arranged to carry the BSS color value BSS_Color (labeled "HE-SIG-A1 B5-B10: BSS_Color" for brevity), and Bits 11-14 of the symbol HE-SIG-A1 may be arranged to carry the SR-field value Spatial_Reuse (labeled "HE-SIG-A1 B11-B14: Spatial_Reuse" for brevity).

Figure 11:
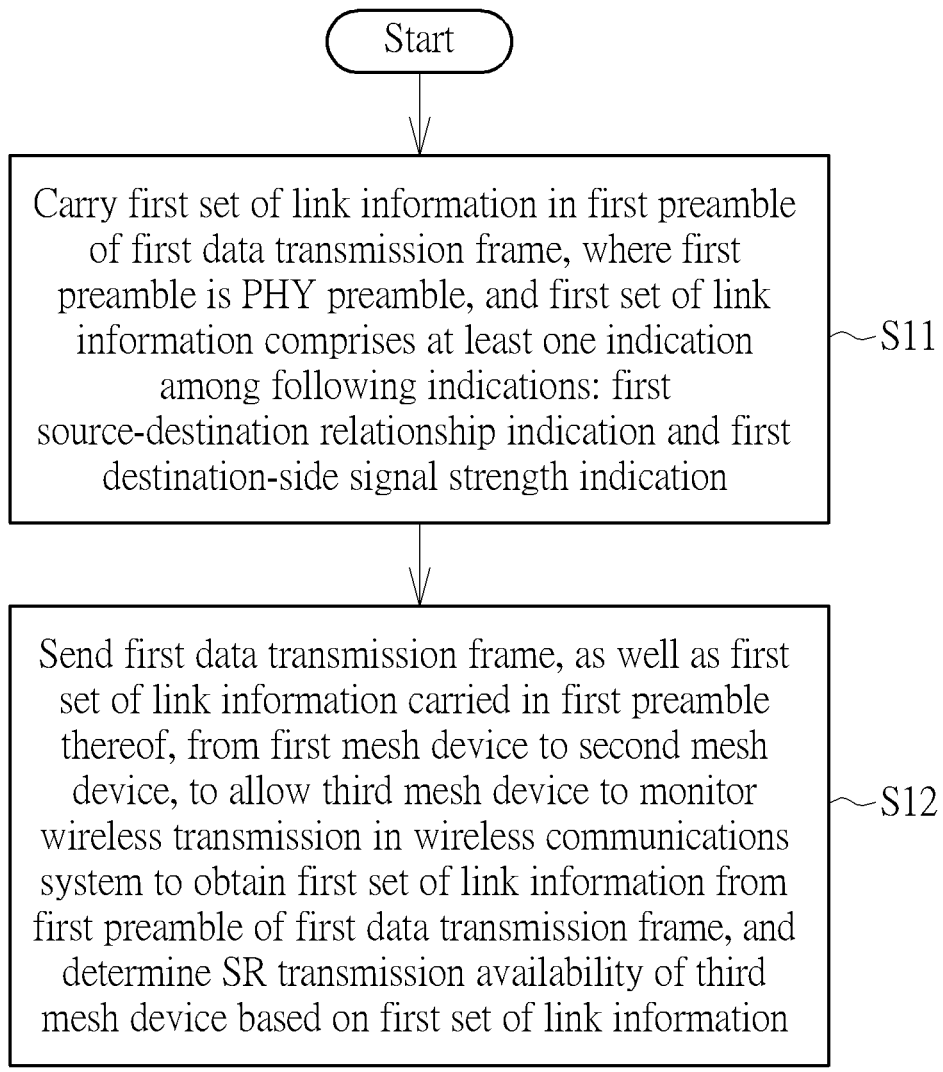
FIG. 11 illustrates a working flow of the method according to an embodiment of the present invention.

FIG. 11 illustrates a working flow of the method according to an embodiment of the present invention.

In Step S11, the first mesh device may carry the first set of link information in the first preamble of the first data transmission frame (e.g., the first PPDU among the four PPDUs), where the first preamble is the PHY preamble of the first data transmission frame, and the first set of link information may comprise the aforementioned at least one indication among the following indications:
  (1) the first source-destination relationship indication between the first mesh device and the second mesh device, for indicating the source-destination relationship between the first mesh device and the second mesh device; and
  (2) the first destination-side signal strength indication regarding the first mesh device and the second mesh device, for indicating at least one predicted signal strength measured for the first mesh device and the second mesh device, such as the aforementioned at least one predicted signal strength of the first data transmission frame (e.g., the first PPDU) at the second mesh device.

In Step S12, the first mesh device may send the first data transmission frame (e.g., the first PPDU), as well as the first set of link information carried in the first preamble (e.g., the PHY preamble) thereof, from the first mesh device to the second mesh device, to allow the third mesh device to monitor wireless transmission in the wireless communications system 100 to obtain the first set of link information from the first preamble (e.g., the PHY preamble) of the first data transmission frame (e.g., the first PPDU), and determine the SR transmission availability of the third mesh device based on the first set of link information.

More particularly, the third mesh device may obtain the first set of link information from the PHY preamble of the first data transmission frame (e.g., the first PPDU) only, having no need to decode the remaining frame contents (e.g., a MAC header) of the first data transmission frame (e.g., the first PPDU). In a situation where the signal strength of the first data transmission frame is insufficient at the third mesh device for correctly decoding the remaining frame contents (e.g., the MAC header) of the first data transmission frame, the operations of third mesh device will not be hindered. When there is a need, the third mesh device is capable of performing an SR transmission operation to another mesh device with respect to the first data transmission frame (e.g., the first PPDU) in order to enhance the overall performance.

For example, the first set of link information mentioned above may comprise:
(1) the first source-destination relationship indication for indicating the source-destination relationship between the first mesh device and the second mesh device, such as the BSS color value BSS_Color carried by the BSS color field in the PHY preamble or the BSS-color-value and SR-field-value set (e.g., the combination of the BSS color value BSS_Color and the SR-field value Spatial_Reuse) corresponding to the second mesh device, or
(2) the first destination-side signal strength indication for indicating the aforementioned at least one predicted signal strength (e.g., the first RSSI range) of the first data transmission frame (e.g., the first PPDU) at the second mesh device;
but the present invention is not limited thereto. According to some embodiments, the first set of link information may comprise both of the first source-destination relationship indication and the first destination-side signal strength indication. For brevity, similar descriptions for this embodiment are not repeated in detail here.

For better comprehension, the method may be illustrated with the working flow shown in FIG. 11, but the present invention is not limited thereto. According to some embodiments, one or more steps may be added, deleted, or changed in the working flow shown in FIG. 11.

Figure 12:
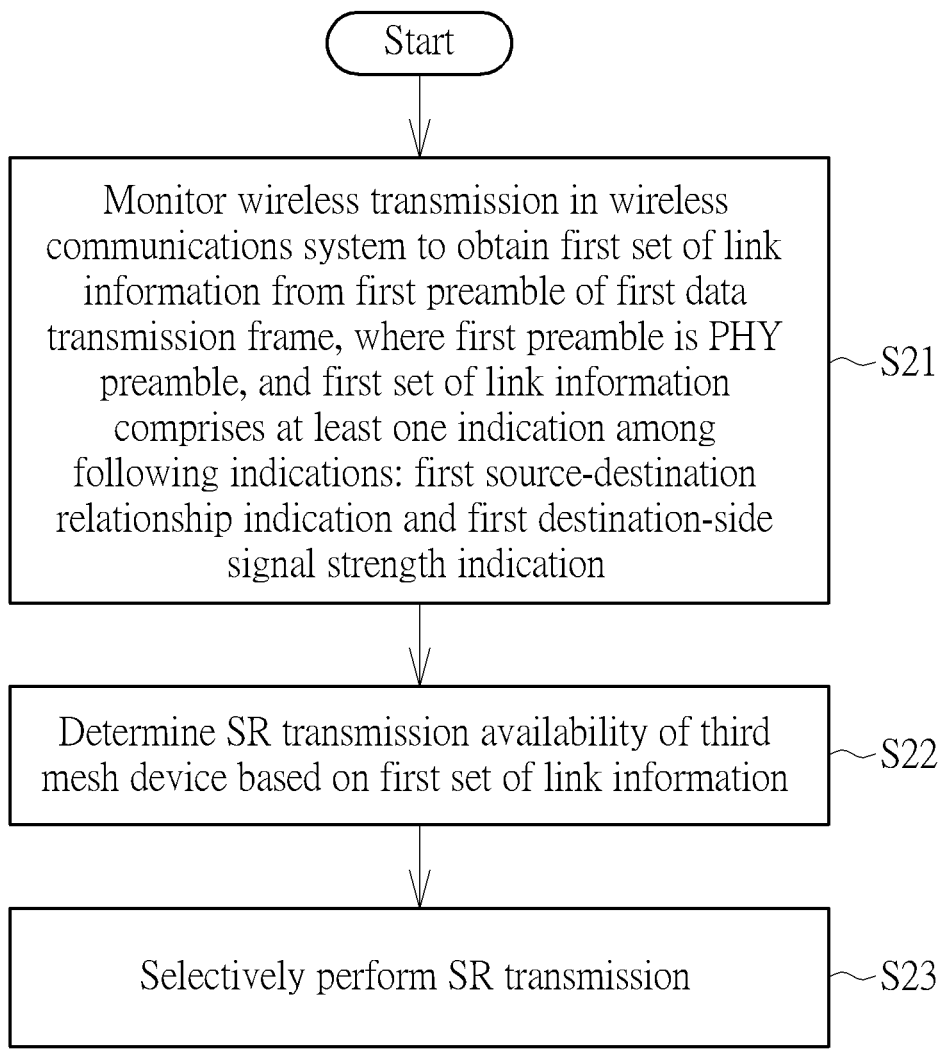
FIG. 12 illustrates a working flow of the method according to another embodiment of the present invention.

FIG. 12 illustrates a working flow of the method according to another embodiment of the present invention.

In Step S21, the third mesh device may monitor wireless transmission in the wireless communications system 100 to obtain the first set of link information from the first preamble of the first data transmission frame (e.g., the first PPDU), where the first preamble is the PHY preamble of the first data transmission frame, and the first set of link information may comprise the aforementioned at least one indication among the following indications:
(1) the first source-destination relationship indication between the first mesh device and the second mesh device, for indicating the source-destination relationship between the first mesh device and the second mesh device; and
(2) the first destination-side signal strength indication regarding the first mesh device and the second mesh device, for indicating the aforementioned at least one predicted signal strength measured for the first mesh device and the second mesh device in the operation of Step S11, such as the aforementioned at least one predicted signal strength of the first data transmission frame (e.g., the first PPDU) at the second mesh device.

In Step S22, the third mesh device may determine the SR transmission availability of the third mesh device based on the first set of link information (e.g., the first PPDU).

In Step S23, the third mesh device may selectively perform the SR transmission, and more particularly, selectively perform an SR transmission operation according to the determination result of the operation of Step S22, in order to try enhancing the overall performance.

For example, the third mesh device may perform the SR transmission operation to another mesh device with respect to the first data transmission frame (e.g., the first PPDU) in order to enhance the overall performance, where the second mesh device can correctly receive and process the first data transmission frame (e.g., the first PPDU), without being hindered by this SR transmission operation. For brevity, similar descriptions for this embodiment are not repeated in detail here.

For better comprehension, the method may be illustrated with the working flow shown in FIG. 12, but the present invention is not limited thereto. According to some embodiments, one or more steps may be added, deleted, or changed in the working flow shown in FIG. 12.

According to some embodiments, if the first set of link information comprises the first source-destination relationship indication for indicating the source-destination relationship between the first mesh device and the second mesh device, any mesh device among the first mesh device and the second mesh device may be an AP device 110_$m$ among the multiple AP devices (e.g., the AP devices {110_$m$|m=0, . . . , (M−1)}) or a STA device 120_$n$ among the multiple STA devices (e.g., the STA devices {120_$n$|n=0, . . . , (N−1)} in the wireless communications system 100, and the third mesh device may be one of the multiple AP devices (e.g., the AP devices {110_$m$|m=0, . . . , (M−1)}). For example, the first source-destination relationship indication may be implemented by way of the BSS color value BSS_Color with any bit sequence combination (e.g., a 6 bits value, such as a value among {1, 2, . . . , 63}, except 0), but the present invention is not limited thereto. In some examples, the first source-destination relationship indication may be implemented by way of the SR-field value Spatial_Reuse with any bit sequence combination (e.g., a 4 bits value, such as a value among {1, 2, . . . , 12}, except {0, 13, 14, 15}), and more particularly, the BSS-color-value and SR-field-value set (BSS_Color, Spatial_Reuse) with any bit sequence combination available (e.g., a combination of the BSS color value BSS_Color and the SR-field value Spatial_Reuse). In addition, if the first set of link information comprises a first destination-side signal strength indication for indicating the aforementioned at least one predicted signal strength of the first data transmission frame at the second mesh device, any mesh device among the first mesh device and the second mesh device may be an AP device 110_$m$ among the multiple AP devices (e.g., the AP devices {110_$m$|m=0, . . . , (M−1)}) or a STA device 120_$n$ among the multiple STA devices (e.g., the STA devices {120_$n$|n=0, . . . , (N−1)} in the wireless communications system 100, and the third mesh device may be one of the multiple AP devices (e.g., the AP devices {110_$m$|m=0, . . . , (M−1)}). For example, the first destination-side signal strength indication may be implemented by way of the SR-field value Spatial_Reuse with any bit sequence combination (e.g., a 4 bits value, such as a value among {1, 2, ..., 12}, except {0, 13, 14, 15}). For brevity, similar descriptions for these embodiments are not repeated in detail here.

According to some embodiments, the first set of link information may comprise both of the first source-destination relationship indication and the first destination-side signal strength indication. For example, both of the first mesh device and the second mesh device may be AP devices {110_$m$} among the multiple AP devices (e.g., the AP devices {110_$m$|m=0, (M−1)}), but the present invention is not limited thereto. In some examples, any mesh device among the first mesh device and the second mesh device may be an AP device 110_$m$ among the multiple AP devices (e.g., the AP devices {110_$m$|m=0, ..., (M−1)}) or a STA device 120_$n$ among the multiple STA devices (e.g., the STA devices {120_$n$|n=0, ..., (N−1)}). For brevity, similar descriptions for these embodiments are not repeated in detail here.

According to some embodiments, the first mesh device may be arranged to carry another set of link information in a preamble (e.g., a PHY preamble) of another first data transmission frame (e.g., another first PPDU) transmitted from the first mesh device to the second mesh device, where the other set of link information may comprise a forbidden indication regarding the SR transmission availability of the third mesh device, for indicating that it is forbidden to perform any SR transmission operation with respect to the other first data transmission frame (e.g., the other first PPDU). In response to the existence of the forbidden indication, the third mesh device may be arranged to prevent performing any SR transmission operation with respect to the other first data transmission frame (e.g., the other first PPDU). More particularly, the forbidden indication may be a predetermined SR-field value for indicating an invalid RSSI value (e.g., −127), where the predetermined SR-field value may be equal to 12. For example, in the architecture shown in FIG. 7, the first mesh device such as the STA1 may be arranged to transmit the other first data transmission frame (e.g., the other first PPDU) carrying the other set of link information to the second mesh device such as the mesh AP1, and the third mesh device such as the mesh AP3 may be arranged to monitor the wireless transmission in the wireless communications system 100 to obtain the other set of link information from the preamble (e.g., the PHY preamble) of the other first data transmission frame (e.g., the other first PPDU). For better comprehension, the table content "RSSI<−70 dBm" corresponding to Spatial_Reuse=12 as shown in Table 3 may be replaced with the invalid RSSI value such as −127 (dBm). When detecting that the forbidden indication exists in the other set of link information (e.g., Spatial_Reuse=12), the third mesh device such as the mesh AP3 may prevent performing any SR transmission operation with respect to the other first data transmission frame (e.g., the other first PPDU). For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing mesh control in a wireless communications system, the wireless communications system comprising a first mesh device, a second mesh device and a third mesh device, the method comprising:

carrying a set of link information in a preamble of a first data transmission frame transmitted from the first mesh device to the second mesh device, wherein the set of link information comprises at least one indication among the following indications: a source-destination relationship indication between the first mesh device and the second mesh device, the source-destination relationship indication dedicated to the first mesh device and the second mesh device, and at least one predicted signal strength measured for the first mesh device and the second mesh device;

wherein the third mesh device is arranged to monitor wireless transmission in the wireless communications system to obtain the set of link information from the first data transmission frame, and determine spatial reuse (SR) transmission availability of the third mesh device based on the set of link information.

2. The method of claim 1, wherein the first data transmission frame is a physical layer (PHY) protocol data unit (PPDU), and the preamble is the PHY preamble of the PPDU.

3. The method of claim 2, wherein the at least one indication is carried in at least one field in the PHY preamble, and the at least one field comprises one or a combination of a basic service set (BSS) color field and an SR field in the PHY preamble.

4. The method of claim 1, wherein the third mesh device is arranged determine the SR transmission availability based on the source-destination relationship indication.

5. The method of claim 4, wherein at least one mesh control device in the wireless communications system is arranged to obtain multiple sets of link information among different mesh devices, the third mesh device being informed of at least a part of the multiple sets of link information from the mesh control device, wherein the multiple sets of link information comprise combinations of BSS color information and source-destination information.

6. The method of claim 5, wherein the at least one mesh control device may comprise one or a combination of the first mesh device and the third mesh device.

7. The method of claim 4, wherein the first data transmission frame is a physical layer (PHY) protocol data unit (PPDU), and the preamble is the PHY preamble of the PPDU; and the first source-destination relationship indication is carried in at least one field in the PHY preamble, wherein the at least one field comprises one or a combination of a basic service set (BSS) color field and an SR field in the PHY preamble.

8. The method of claim 7, wherein the BSS color field is arranged to carry the first source-destination relationship indication; and respective BSS color fields of respective PHY preambles of multiple data transmission frames from the first mesh device to different destinations are arranged to carry different BSS color values, wherein the second mesh device is one of said different destinations, and the first source-destination relationship indication is a BSS color value corresponding to the second mesh device among said different BSS color values.

9. The method of claim 7, wherein the combination of the BSS color field and the SR field in the PHY preamble are arranged to carry the first source-destination relationship indication; and respective BSS color fields of respective PHY preambles of multiple data transmission frames from the first mesh device to different destinations are arranged to carry a same BSS color value, and respective SR fields of the respective PHY preambles of the multiple data transmission frames from the first mesh device to said different destinations are arranged to carry different SR-field values, wherein the second mesh device is one of said different destinations, and the first source-destination relationship indication is a BSS-color-value and SR-field-value set corresponding to the second mesh device among multiple predetermined BSS-color-value and SR-field-value sets.

10. The method of claim 1, wherein the third mesh device is arranged to determine the SR transmission availability based on the at least one predicted signal strength.

11. The method of claim 10, wherein the first data transmission frame is a physical layer (PHY) protocol data unit (PPDU), and the preamble is the PHY preamble of the first PPDU; and a destination-side signal strength indication indicating the at least one predicted signal strength is carried by an SR field in the PHY preamble.

12. The method of claim 11, wherein the destination-side signal strength indication is an SR-field value for indicating a received signal strength indicator (RSSI) range among multiple predetermined RSSI ranges, wherein the SR-field value is equal to any value among multiple integer values in a predetermined interval.

13. The method of claim 1, further comprising:
carrying another set of link information in a preamble of another first data transmission frame transmitted from the first mesh device to the second mesh device, wherein the other set of link information comprises a forbidden indication regarding the SR transmission availability of the third mesh device;
wherein according to the forbidden indication, the third mesh device is prevented from performing any SR transmission operation with respect to the other first data transmission frame.

14. The method of claim 13, wherein the forbidden indication is a predetermined SR-field value for indicating an invalid received signal strength indicator (RSSI) value, wherein the predetermined SR-field value is equal to 12.

15. The method of claim 1, wherein the first data transmission frame is a non-trigger-based (non-TB) frame.

16. The method of claim 1, wherein the at least one predicted signal strength comprises a signal strength of a previous frame sent from the first mesh device to the second mesh device.

17. The method of claim 1, wherein:
if the set of link information comprises the source-destination relationship indication, the first mesh device is an access point (AP) device or a station (STA) device, the second mesh device is an AP device or a STA device, and the third mesh device is an AP device; and
if the set of link information comprises the at least one predicted signal strength, the first mesh device is an AP device or a STA device, the second mesh device is an AP device or a STA device, and the third mesh device is an AP device.

18. The method of claim 17, wherein the set of link information comprises both of the source-destination relationship indication and the at least one predicted signal strength.

19. A second mesh device that operates according to the method of claim 1, wherein the second mesh device comprises:
a processing circuit, arranged to control operations of the second mesh device; and
at least one communications control circuit, coupled to the processing circuit, arranged to perform communications control, wherein the at least one communications control circuit is arranged to perform wireless communications operations with the first mesh device for the second mesh device;
wherein:
the second mesh device is arranged to receive the first data transmission frame carrying the set of link information in the preamble and correctly process the first data transmission frame, without being hindered by any spatial reuse (SR) transmission performed by the third mesh device to another mesh device with respect to the first data transmission frame.

20. A first mesh device, for performing mesh control in a wireless communications system, the wireless communications system comprising the first mesh device, a second mesh device and a third mesh device, the first mesh device comprising:
a processing circuit, arranged to control operations of the first mesh device; and
at least one communications control circuit, coupled to the processing circuit, arranged to perform communications control, wherein the at least one communications control circuit is arranged to perform wireless communications operations with the second mesh device for the first mesh device;
wherein:
the first mesh device is arranged to carry a set of link information in a preamble of a first data transmission frame transmitted from the first mesh device to the second mesh device, wherein the set of link information comprises at least one indication among the following indications: a source-destination relationship indication between the first mesh device and the second mesh device, the source-destination relationship indication dedicated to the first mesh device and the second mesh device, and at least one predicted signal strength measured for the first mesh device and the second mesh device; and
the third mesh device is arranged to monitor wireless transmission in the wireless communications system to obtain the set of link information from the first data transmission frame, and determine spatial reuse (SR) transmission availability of the third mesh device based on the set of link information.

21. A method for performing mesh control in a wireless communications system, the wireless communications system comprising a first mesh device, a second mesh device and a third mesh device, the method comprising:
monitoring wireless transmission in the wireless communications system to obtain a set of link information from a preamble of a first data transmission frame, wherein the first mesh device is arranged to carry the set of link information in the preamble of the first data transmission frame transmitted from the first mesh device to the second mesh device, wherein the set of link information comprises at least one indication among the following indications: a source-destination relationship indication between the first mesh device and the second mesh device, the source-destination relationship indication dedicated to the first mesh device and the second mesh device, and at least one predicted signal strength measured for the first mesh device and the second mesh device; and
determining spatial reuse (SR) transmission availability of the third mesh device based on the set of link information.

* * * * *